US007231074B2

(12) United States Patent
Raunig

(10) Patent No.: US 7,231,074 B2
(45) Date of Patent: Jun. 12, 2007

(54) METHOD FOR DETERMINING THE EFFICACY OF AN ANTI-CANCER TREATMENT USING IMAGE ANALYSIS

(75) Inventor: David L. Raunig, Groton, CT (US)

(73) Assignee: Pfizer Inc., New York, NY (US)

( * ) Notice: Subject to any disclaimer, the term of this patent is extended or adjusted under 35 U.S.C. 154(b) by 895 days.

(21) Appl. No.: 10/437,975

(22) Filed: May 15, 2003

(65) Prior Publication Data

US 2004/0013292 A1    Jan. 22, 2004

Related U.S. Application Data

(60) Provisional application No. 60/381,064, filed on May 17, 2002.

(51) Int. Cl.
    *G06K 9/00*      (2006.01)
(52) U.S. Cl. .................................... 382/128; 382/173
(58) Field of Classification Search ................ 382/128, 382/130, 131, 132, 173; 128/922
See application file for complete search history.

(56) References Cited

U.S. PATENT DOCUMENTS

| | | | | |
|---|---|---|---|---|
| 5,359,513 | A * | 10/1994 | Kano et al. ............. | 364/413.23 |
| 6,909,792 | B1 * | 6/2005 | Carrott et al. ............. | 382/128 |
| 2002/0106119 | A1 | 8/2002 | Foran et al. | |
| 2002/0119441 | A1 * | 8/2002 | Elias ............................ | 435/4 |
| 2002/0177777 | A1 | 11/2002 | Nordstrom et al. | |
| 2003/0072479 | A1 * | 4/2003 | Totterman et al. .......... | 382/131 |
| 2004/0066955 | A1 * | 4/2004 | Tamez-Pena et al. ....... | 382/128 |

OTHER PUBLICATIONS

McNitt-Gray et al., "Contrast Enhancement Maps for Lung Lesions Imaged on CT," Proc. SPIE vol. 3978: Medical Imaging 2000: Physiology and Function from Multidimensional Images, Feb. 2000, pp. 78-83.*
Gordon et al., "Utilization of Experimental Animal Model for Correlative Multispectral MRI and Pathological Analysis of Brain Tumors," Magnetic Resonance Imaging, vol. 17, No. 10, 1999, pp. 1495-1502.*
Vaidyananthan et al., "Monitoring Brain Tumor Response to Therapy Using MRI Segmentation," Magnetic Resonance Imaging, vol. 15, No. 13, 1997, pp. 323-334.*
M. Sonka, J.M Fitzpatrick (EDS.): "Handbook of Medical Imaging, vol. 2. Medical Image Processing and Analysis" 2000, SPIE Press, Bellingham, pp. 100-109, 284, 258.
M Tuceryan, A.K. Jain: "Chapter 2.1, Texture Analysis" in "The Handbook of Pattern Recognition and Computer Vision (2nd Edition)" C.H. Chen, et al., 1998, pp. 207-248; Fig. 7.
Jianchao, et al. "Texture Segmentation of Ultrasound B-Scan Image by Sum and Difference Histograms" Proceedings of the Annual International Conference of the Engineering in Medicare and Biology Society, New York, IEEE, vol. 1. No. 2, November 9, 1989, pp. 417-418.
Wong, Sh, et al., "Automatic segmentation of ultrasonic image" Proceedings of the Region Ten Conference, Oct. 19-21, 1993, vol. 3, Oct. 19, 1993, pp. 910-913.
De Backer, et al., "A competitive elliptical clustering algorithm" Pattern Recognition Letters, vol. 20, No. 11-13, Nov. 1999, pp. 1141-1147.
Subramaniam, et al., "Seafloor characterization using texture" Southeastcon 1993, Proceedings, IEEE, Apr. 4, 1993, p. 8.
F. Cavayas, et al., "Chapter 3.8, Pattern Recognition and Computer Vision for Geographic Data Analysis" in The Handbook of Pattern Recognition and Computer vision (2nd Edition), 1998, pp. 646-649; Fig. 7.
Xiaoguang Wang, et al., "Using Three-Dimensional Features to Improve Terrain Classifications" Computer Vision and Pattern Recognition, 1997, Proceedings., 1997 IEEE Computer Society Conference, Jun. 17, 1997, pp. 915-920.

* cited by examiner

*Primary Examiner*—Andrew W. Johns
(74) *Attorney, Agent, or Firm*—Gregg C. Benson; Gabriel L. Kleiman

(57) ABSTRACT

An apparatus, system, method, and computer readable medium containing computer-executable code for implementing image analysis uses multivariate statistical analysis of sample images, and allows segmentation of the image into different groups or classes, depending on a correlation to one or more sample textures, or sample surface features. In one embodiment, the invention performs multivariate statistical analysis of ultrasound images, wherein a tumor may be characterized by segmenting viable tissue from necrotic tissue, allowing for more detailed in vivo analysis of tumor growth beyond simple dimensional measurements or univariate statistical analysis. Application of the apparatus and method may also be used for characterizing other types of samples having textured features including, for example, tumor angiogenesis biomarkers from Power Doppler.

4 Claims, 16 Drawing Sheets

METHOD FOR DETERMINING THE EFFICACY OF AN ANTI-CANCER TREATMENT USING IMAGE ANALYSIS

CROSS-REFERENCE TO RELATED APPLICATIONS

This application claims priority to provisional application No. 60/381,064 filed on May 17, 2002 by David L. Raunig, entitled "Apparatus and Method for Statistical Image Analysis", the entire contents of which are incorporated herein by reference, and for which benefit is claimed under 35 U.S.C. §119(e).

FIELD OF THE INVENTION

This invention relates generally to an apparatus, a system, and method for the analysis of images, and more particularly to a method for the analysis of ultrasonic images. This invention further relates even more particularly to an apparatus and method for the analysis of ultrasonic images using multivariate detection techniques, which, in one exemplary embodiment, may be used to differentiate image pixels representing necrotic material from image pixels representing viable tissue within a specified region of interest, and which, in a further aspect of the invention, may be used in a method for treating cancer.

BACKGROUND OF THE INVENTION

Changes in tissue types are manifested in ultrasound propagation as changes in acoustic properties, which in turn lead to the bright echoes from the interfaces. In the case of tumors, the interior tissue is generally a homogeneous mixture of viable cancer cells, capillaries, connective tissue and necrotic cells. The amount of necrosis can provide some valuable clues to the viability of the tumor, itself.

Conventionally, since capillaries are the sites of the vital interchange of blood nutrients and cellular metabolites in healthy tissue, a measurement of vascularity may be used as an indicator of tissue viability, often calling for excision of a treated section of tissue for histopathology. The tissue is stained for vascular endothelia, usually the stain CD31, and the microvascular density (MVD) is measured under a microscope. The MVD is a standard measurement of the efficacy of angiogenic and anti-angiogenic drugs. Additionally, optical microscopy can also be used to image and measure the amount of dead, or necrotic tissue within a tumor.

Typical histopathology analysis of a tumor involves removal of the tumor from the animal, fixing the tumor with a fixative agent, usually Neutral Buffered Formalin (NBF) or ethanol (ETOH), and examining the specimen one thin slice at a time. This conventional approach necessarily requires more specimens (i.e. animals) than a longitudinal experiment over time, and is very labor intensive.

Necrosis in tissue occurs as a result of a fatal injury to a cell. Cells, upon death, elicit an inflammatory response and quickly deteriorate. Cell structure disintegrates, cell walls break down (lyse) and the fragmented cell contents, including nuclear material, spill into the interstitial spaces between the cells. Necrotic tissue even appears different from viable cells under the microscope, and it is recognizable by the complete absence of structure. Necrosis is histologically identified by the structure of the tissue using stains differential to nucleic proteins. However, histopathology is necessarily post-mortem, and a longitudinal analysis of the tumor over time is not possible.

Additionally, cancer treatments that target the cells increase the regions of necrosis around the intratumoral blood vessels. The presence of necrosis can therefore be used to analyze such characteristics as tumor morphology, tumor angiogenesis and efficacy of anti-cancer therapy; however, the study of these metrics has traditionally been done using optical microscopy and histopathology biomarkers. In laboratory research, where the number of animals used for research can be quite large, histopathology measurements are time consuming, expensive and require terminating the study of the subject. Additionally, tissue fixing can result in damage to some aspect of the tumor and loss of information.

As indicated above, past study of tumors and development of anti-cancer therapies have primarily relied on terminating the study at specified time points and performing histological tests on the excised tumor. This process is time consuming, requires the use of a large number of subjects, and necessarily precludes the use of longitudinal measurements on the same tumor. In addition to the statistical problems posed by the lack of repeated measurements, the histological analysis of tumors is done using microscopically thin slices of the tumor, providing information on a very limited region, in a non-realtime manner.

Ultrasonic imaging techniques are widely used in imaging portions of the body, including analysis of tumors. Changes in tissue types are manifested in ultrasound propagation as changes in acoustic properties, which in turn lead to the bright echoes from the interfaces.

Clinical ultrasound instruments can be classified into two broad categories: Continuous Wave and Pulsed Wave. Continuous Wave ultrasound is used primarily for its Doppler capabilities as an audio aid to detect flowing blood. Pulsed ultrasound is used for imaging, and nearly all modern pulsed wave ultrasound devices employ color representations of blood flow (CD) to associate movement to a pixel.

Ultrasound imaging equipment has made significant improvements, and now has capabilities that were not possible only a few years ago. With an increase in frequency and resolution, it is now possible to use ultrasound in a number of clinical settings that were previously reserved only for X-ray imaging. Increased resolution and decreased noise can now provide clear images able to detect details that would have, in many situations, required extensive interpretation in the past. In the late 1980's and early 1990's, ultrasonic tissue characterization had mixed results due to the characteristic coherent interference phenomenon known as "speckle". With the improvement in devices and the increase in ultrasound frequency, also came an increase in the bandwidth with concomitant speckle reduction. The engineering advances in clinical ultrasound equipment can now allow tissue characterization, at least in research environments that were previously reserved for special instrumentation.

The ultrasound image is characterized by pixels of differing intensities that may be used to differentiate different regions of interest. Additionally, some tissue types can be subjectively identified by their texture. Intensities of the necrotic core of a tumor are brighter than the viable border tissue, for example. Observing necroses obtained from histopathologic sampling under the microscope and correlating the observed features with the corresponding ultrasound images, shows that there is a coarse texture to the necrotic regions, as illustrated in FIG. 1, which shows a B16-F10 tumor stained for CD34. FIG. 1(a) shows a region of healthy tumor cells, and FIG. 1(b) shows a region of necrosis.

In the case of tumors, the interior tissue is generally a homogeneous mixture of viable cancer cells, capillaries, connective tissue and necrotic cells. As mentioned above, the amount of necrosis can provide some valuable clues to the viability of the tumor, itself. Tumor cells lack the normal, programmed cell-death mechanisms that keep normal cells in check. However, tumor cells, like all living cells, can die if exposed to a fatal environment. For a new tumor without medical intervention, the cells farthest away from the peritumoral regions and outside the perfusion range of newly formed microvasculature die from lack of oxygen and nutrients.

The ability of ultrasound to discriminate between viable and necrotic tumor regions has previously been accomplished using the ultrasound backscatter microscope (UBM). The necrotic core of a tumor spheroid is known to be detectable using very high ultrasound frequencies. There are morphological differences between the two regions, as determined by histopathology. In a very high frequency (e.g., 100 MHz) ultrasound image, the necrotic core appears as a bright circular region in the middle of the tumor spheroid, because of the increased density of nuclei. However, such high frequency ultrasound devices are relatively expensive, and are not readily available in clinical settings, in comparison to lower frequency devices, e.g., devices operating in the 4–12 MHz region, for example.

There are three primary characteristics of tissue that can increase backscattered energy, and result in brighter pixels in the resulting image:
1. the number of scattering bodies;
2. the reflectivity of the scattering bodies; and
3. the spatial distribution of scattering bodies within the resolved area of the image.

However, previous efforts in analyzing image pixel data to place the pixels into one of two groups, e.g., necrotic tissue and viable tissue, have used conventional univariate approaches, as shown in FIG. 2, which provides a flowchart of a conventional univariate K-Means segmentation algorithm for normally distributed clusters. Such an approach relies upon a relatively simple univariate statistical "distance" related to the difference between an intensity value of a particular pixel, and the "average" or mean intensity value representative of a group of pixels. Unfortunately, and as determined by the use of histopathologic sampling and training images, this univariate approach results in a higher probability of misclassifying a significant portion of the various pixels into the wrong class. Further, univariate statistical analysis of image pixel data increases the probability of both Type I and Type II errors, along with the misclassification of pixels.

What is needed then is an apparatus and method that allows more powerful statistical test of differences over time, and which includes the repeated longitudinal measurement of a tumor as it progresses in a single subject.

What is further needed is an apparatus and method for ultrasound imaging, using multiple image characteristics, to provide a means of performing non-histopathologic longitudinal segmentation of an image, including identification and differentiation of tumor necrosis and viable tissue.

What is still further needed is an apparatus and method for multivariate analysis of necroses using tissue differentiation based on pixel gray-scale values, augmented by differences in texture to increase the power of the statistical analysis and lower the incidence of misclassification of the different tissue types.

SUMMARY OF THE INVENTION

The present invention solves the aforementioned problems of conventional tumor analysis using histopathology, and the problems of univariate statistical approaches which result in undesirably high rates of misclassification.

The apparatus and method of the invention has, as one object, the provision of a measurement modality for repeated measurements of a tumor that includes differentiation between viable and necrotic tumor tissue, as well as measurements of peritumoral blood flow.

Another object of this invention is to provide a multivariate analysis method to characterize tumor tissue into necrotic and viable regions and provide a surrogate measurement for functional intratumoral microvessel blood flow.

These objectives are accomplished by the use of powerful multivariate statistical analysis methods that take advantage of the joint probability distribution function to increase both specificity and sensitivity of the image segmentation. In addition to the immediate advantages to the specific application to cancer research, this method may be adapted to the segmentation of other tissue regions of interest. The experimental results and the analysis of images obtained by the apparatus and method of the invention show that the multivariate analysis of ultrasound images more accurately characterize tumors by properly segmenting viable from necrotic tissue.

In addition to the immediate advantages of one embodiment of the invention directed to cancer treatment, this method is easily adapted to the segmentation of other tissue regions of interest or, in general, to segmentation of a wide variety of image types into various regions of interest, based upon multivariate statistical analysis of image features corresponding to actual sample features, for example, a surface feature.

Biomedical imaging modalities can provide a quick, non-invasive means of obtaining information on the interior of the tumor. While some imaging modalities are cumbersome and expensive for small animal research, modern ultrasound provides an inexpensive and relatively easy to use clinical imaging modality that can provide detail not previously available, and the enhanced detail allows the analyst to measure the image texture, and use this information to classify regions.

For example, ultrasound is non-invasive, non-ionizing, inexpensive and easily adaptable for use in clinical settings for imaging humans and other animals. Additional Doppler information available within the ultrasound image provides an added dimension for tumor image analysis that includes a surrogate measure for angiogenesis. Further, ultrasound allows for a detailed examination of the tumor over time without excision from the body, saving time and resources, both animal and human.

Ultrasound techniques allow measurement of the actual cross section of the tumor for a particular image slice, and provide the opportunity to use other slices to better estimate the volume of the tumor. Additionally, ultrasound imaging allows the investigator to study tumors in situ, and the tumor growth can be analyzed at intermediate intervals. However, whole-tumor volume calculation alone does not discriminate between viable and necrotic tissue. Measurements taken on the same tumor over time takes advantage of the correlation of those measurements within the same tumor specimen.

One embodiment of the invention includes a method for the analysis of image data represented by multiple pixels, the method characterized by determining a texture value for at least a portion of each of the multiple pixels; initially assigning each of the at least a portion of multiple pixels to one of two or more groups based upon respective determined texture values; calculating an initial statistical distance between at least one pixel and each initial centroid of the two or more groups; comparing each of the calculated initial statistical distances of the at least one pixel with each other; and depending upon the comparison result, reassigning the at least one pixel into a different one of the two or more groups.

In another aspect of this embodiment, a method for the analysis of image data represented by a plurality of pixels is disclosed, the method comprising measuring an intensity level of each of the plurality of pixels; initially assigning each of the plurality of pixels to one of two or more groups; determining an initial centroid for each of the two or more groups; calculating an initial statistical distance between each pixel of the plurality of pixels and each initial centroid for each of the two or more groups; for each pixel of the plurality of pixels, comparing the initial statistical distance for the assigned group with each of the other initial statistical distances associated with respective remaining ones of the two or more groups; reassigning at least one of the plurality of pixels into a different one of the two or more groups based upon the comparison result, wherein, for each pixel of said plurality of pixels, said initial statistical distance is calculated using at least two parameters selected from the group consisting of a pixel intensity, a pixel contrast, and a pixel entropy.

Another embodiment of the invention includes an image analysis system suitable for performing multivariate differentiation between necrotic and viable tissue in a tumor, wherein the system is characterized by an imager outputting image data in a form of pixels; a memory unit storing said image data; a processor operatively responsive to said image data, said processor calculating a vector representation of the image data which includes an intensity, a contrast, and an entropy value for each of the pixels; wherein said processor assigns said each of the pixels into either a necrotic tissue class or a viable tissue classed based upon a texture determined from said vector representation.

In another aspect of this embodiment, an image analysis system suitable for performing multivariate differentiation between necrotic and viable tissue in a tumor is disclosed, wherein the system comprises an imager outputting image data in a form of pixels; a memory unit storing said image data; a processor operatively responsive to said image data, said processor calculating a vector representation of the image data which includes an intensity, a contrast, and an entropy value for each of the pixels; wherein said processor assigns said each of the pixels into either a necrotic tissue class or a viable tissue classed based upon a texture determined from said vector representation, wherein said processor calculates a necrotic Mahalanobis distance between each pixel of the image data and a centroid of the necrotic tissue class and a viable Mahalanobis distance between each pixel of the image data and a centroid of the viable tissue class, wherein, for each pixel of the image data, said processor compares the necrotic and viable Mahalanobis distances and reassigns at least one pixel to a different class based upon the comparison.

In yet another aspect of this embodiment, an ultrasonic imaging apparatus is disclosed, which is characterized by an ultrasonic transceiver which transmits an ultrasonic signal, receives an ultrasonic signal reflected from a sample, and provides an output signal which includes pixel image data representative of the sample; a processor coupled to said ultrasonic transceiver, said processor processing at least a portion of the pixel image data to determine a cooccurrence matrix corresponding to a plurality of image pixels in the pixel image data, wherein said processor classifies each of the plurality of image pixels into one or more classes based upon the cooccurrence matrix.

Yet another embodiment of the invention is directed to a computer readable medium containing computer-executable code for implementing image analysis which is characterized by performing the functions of accepting image data from a plurality of pixels; classifying each of the plurality of pixels in one of a plurality of classes; statistically processing the image data and calculating at least a contrast and an entropy value for each of the plurality of pixels; and reclassifying at least a portion of the plurality of pixels into a different one of the plurality of classes based upon the statistically processed image data In another aspect of this embodiment, a computer readable medium containing computer-executable code for implementing image analysis is disclosed which includes accepting image data from a plurality of pixels; determining an intensity of each of the plurality of pixels; classifying each of the plurality of pixels in one of a plurality of classes; statistically processing the image data and calculating a contrast and an entropy value for each of the plurality of pixels; and reclassifying at least a portion of the plurality of pixels into a different one of the plurality of classes based upon the statistically processed image data, wherein the computer-executable code for implementing image analysis further includes accepting tumor image data and classifying said at least a portion of the plurality of pixels into one of a necrotic tissue class and a viable tissue class based upon the associated contrast and entropy values.

The present application presents a novel, non-obvious multivariate method of tumor tissue differentiation, using present-day, readily available clinical ultrasound technology. The method and apparatus of the present application makes use of the fact that the multivariate use of ultrasound information, including signal intensity and texture measurements, increases the ability to discriminate between regions of necrotic and viable tumor tissue.

The above capability allows for a more detailed in vivo analysis of tumor growth beyond simple dimensional measurements and may be useful in the analysis of tumor angiogenesis biomarkers from Power Doppler. Consequently, longitudinal studies can be done that take advantage of the within-subjects correlation of repeated measurements, reducing the error variance, expanding the statistical inference to the population of subjects and increasing the power of the analysis.

In one aspect of the invention, the k-means clustering algorithm is modified for use with multiple classification variables. K-means clustering is a nonhierarchical method of pixel clustering, and was chosen over other methods for its relative simplicity and ability to use prior information about the clustering variables. Also, k-means clustering as used here, does not assume a minimum contiguous cluster of pixels, since the necroses may vary significantly in size. Known hierarchical methods, such as Bayesian techniques or region growing/splitting, do not provide for intensity grouping reassignment in the case of error. In one aspect of the invention, multivariate description of each pixel is assigned to each pixel, and this multivariate descriptor is used to cluster the pixels into one of two classes—viable or necrotic tissue.

In a further aspect of the invention, the disclosed and claimed invention provides a novel and non-obvious apparatus and method for multivariate segmentation of ultrasound images, which can be used to measure the necrotic core within a hard-cell carcinoma.

BRIEF DESCRIPTION OF THE DRAWINGS

The features and advantages of the invention will be more readily understood upon consideration of the following detailed description of the invention, taken in conjunction with the accompanying drawings in which:

FIG. 1 shows a B 16-F10 tumor stained for CD34.

FIG. 10 shows a tumor pixel intensity profile.

FIG. 14 illustrates image segmentation of a simulated necrotic Area ($\delta=1.0$) within a Rayleigh distributed noise field ($\sigma=1$)

DESCRIPTION OF VARIOUS AND PREFERRED EMBODIMENTS

A first aspect of the invention will be explained with reference to FIGS. 3 and 4, which show the basic geometry of a volume of scatterers corresponding to an image pixel, and a generalized ultrasound system.

Figure 3:
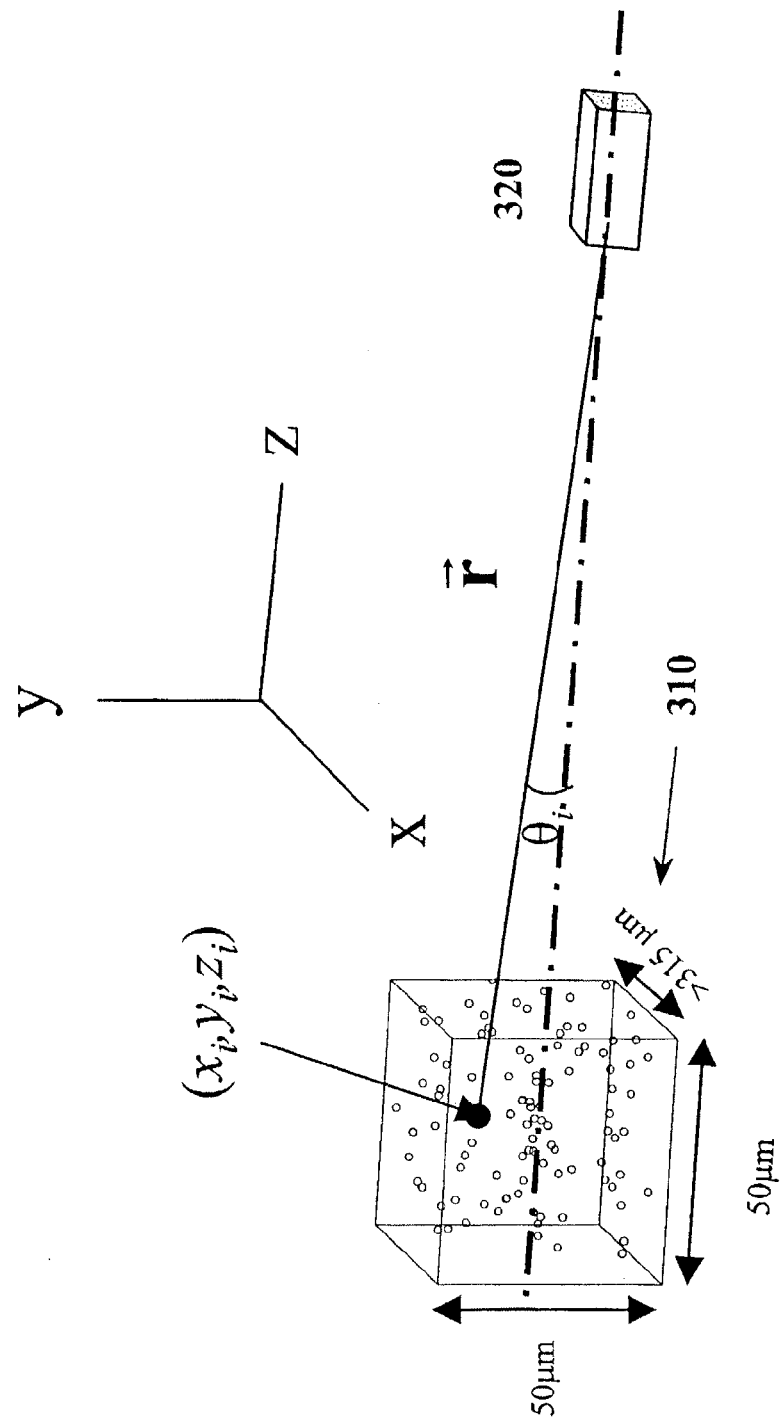
FIG. 3 illustrates the geometry of a volume of scatterers corresponding to a single pixel in an image (voxel)

The geometry of a single voxel 310 of scatterers, corresponding to a single pixel within the image, is depicted in FIG. 3. One tissue parameter that can change the brightness of the image is the number of scatterers within a voxel that corresponds to a single pixel. The mean pixel energy is proportional to the number of scatterers, and is related to the energy transmitted by transducer 320. Therefore, if the density of the scattering bodies increases, the number of scatterers within a voxel increases and the pixel brightness increases. Additionally, if the reflectivity of the scattering bodies increases, the pixel energy increases. Further, if the variation in the characteristic impedances increases, then the reflectivity of the region increases and it follows that the pixel brightness increases.

Additionally, there are many regions within the necroses where the dense nuclei are interspersed with regions of cytoplasm. Therefore, necrotic regions are brighter than viable tumor tissue by the higher scatterer density and the increase in reflectivity.

Another characteristic of necrotic tissue that contributes to the increased necrotic pixel brightness is the tendency of the pyknotic nuclei to clump into non-homogeneous distributions within a single pixel. The clumping leads to a shift in the distribution of the pixel amplitudes, and an increase in the median pixel amplitude. The distribution of the received amplitudes for the non-specular regions within a homogenous volume of tissue is typically Rayleigh.

Since the necrotic tissue visibly appeared to be brighter and easily recognizable, and the histopathology images show the necrotic regions to have coarse irregularities associated with the texture, the distribution of necroses has a different type of distribution than viable tissue, due to the texture differences.

These types of differences lend themselves to being measured by ultrasound techniques. Clinical ultrasound instruments can be classified into two broad categories: Continuous Wave (CW) and Pulsed Wave. Continuous wave ultrasound is used primarily for its Doppler capabilities as an audio aid to detect flowing blood. Pulsed ultrasound is used for imaging, and nearly all modern pulsed wave ultrasound devices employ color representations of blood flow (CD) to associate movement to a pixel. Therefore, the ability to determine, in vivo, the extent of the necrotic core ties in well with contemporary studies in tumor angiogenesis.

Figure 4:
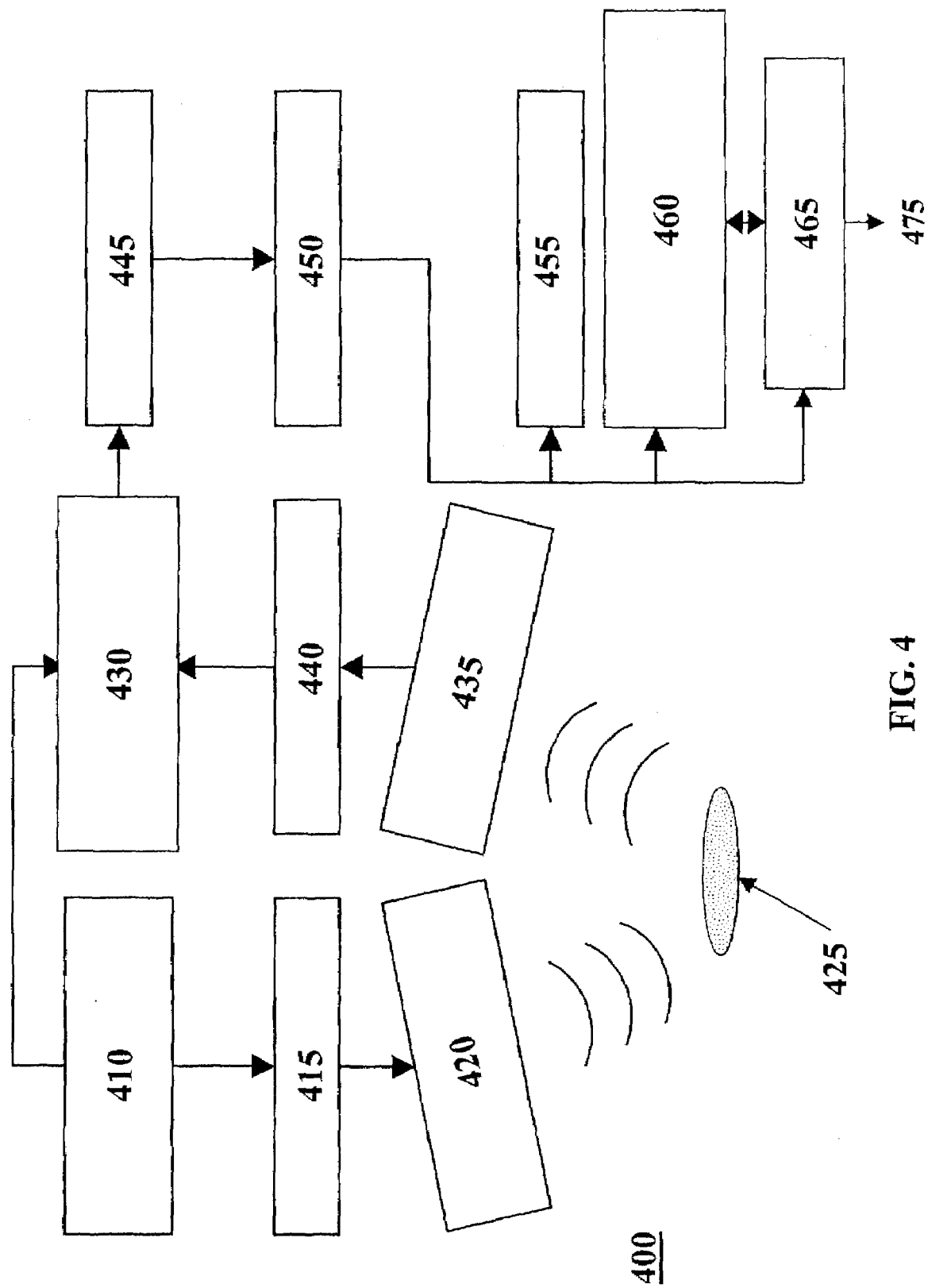
FIG. 4 provides a schematic diagram of a generalized ultrasound system.

As generically illustrated in FIG. 4, ultrasound system 400 may either represent a continuous wave (CW) device, or a pulsed ultrasound apparatus. A reference signal generated by frequency generator 410 is amplified in transmitter 415 and is used to drive the oscillation of a piezoelectric ceramic transmitting transducer 420 that, in turn, transmits an acoustic wave at a single frequency, which is reflected from sample 425. The transmitted waveform is used as a reference signal to demodulate the echo. The resulting demodulated signal, in the case of CW ultrasound, provides data corresponding to the frequency shift, including the amplitude of the signal. For scatterers much smaller than the wavelength of the transmitted wave, each scatterer acts as its own transmitter, and the resulting intensity at the transducer is Rayleigh distributed, where the amplitude of the signal is proportional to the square root of the number of scatterers within the region of insonification.

Equivalently, the power is proportional to the density of scatterers. The theoretical amplitude of the return signal assumes that all of the scatterers within the region of insonification have the same velocity and backscattering cross-section. Deviations from this assumption decrease the amplitude of the maximum Doppler frequency, and distribute the energy to other frequencies.

The reflected signal is preferably received by a receiving transducer 435 that is located near enough to transmitter 415 that the two can be approximated as collocated. The two transducer elements 420, 435 may be tilted slightly toward one another, and placed in a resin that acts as a focal lens. The beams of both transducers preferably intersect at a pre-defined range, and within this intersected range is the optimum axial range for detection. The range may be designed at the factory to be specific to a particular clinical use of the transducer, for example. Range calculations with CW are not possible since the transmitted time cannot be measured. Since the CW transmission is made at a single frequency, any shift in the received frequency can be determined very accurately as a constant Doppler shift within the sample period.

As shown in FIG. 4, the received waveform is preferably demodulated in mixer/demodulator 430 with a sample of the transmitted waveform, filtered by filter 445, and amplified by amplifier 450. The resulting demodulated signal may be shifted so that the transmitting frequency is basebanded at 0 Hz. Doppler shifted waveforms have a negative and positive frequency spectral component at baseband. For example, if the velocity is 2 mm/s toward the transducer, the Doppler frequency shift for a transmitted frequency of 12 MHz is +31.8 Hz. Velocities away from the transducer will be negative. In clinical practice, however, the emphasis is normally on the magnitude of the frequency shift, and a trained specialist typically performs CW ultrasound diagnosis aurally, by audio output 455, for example.

Though a CW ultrasound system can accurately determine the Doppler shift due to motion in the line-of-insonification (LOI), the lack of range information does not allow the Doppler information to be tied to a particular area of interest. Typically, CW ultrasound is used in the audio mode, and placed to insonify tissue where the signal is generally known. For example, CW can be effectively used to detect artifacts of blood flow such as fetal heartbeat or carotid pulse.

Figure 6:
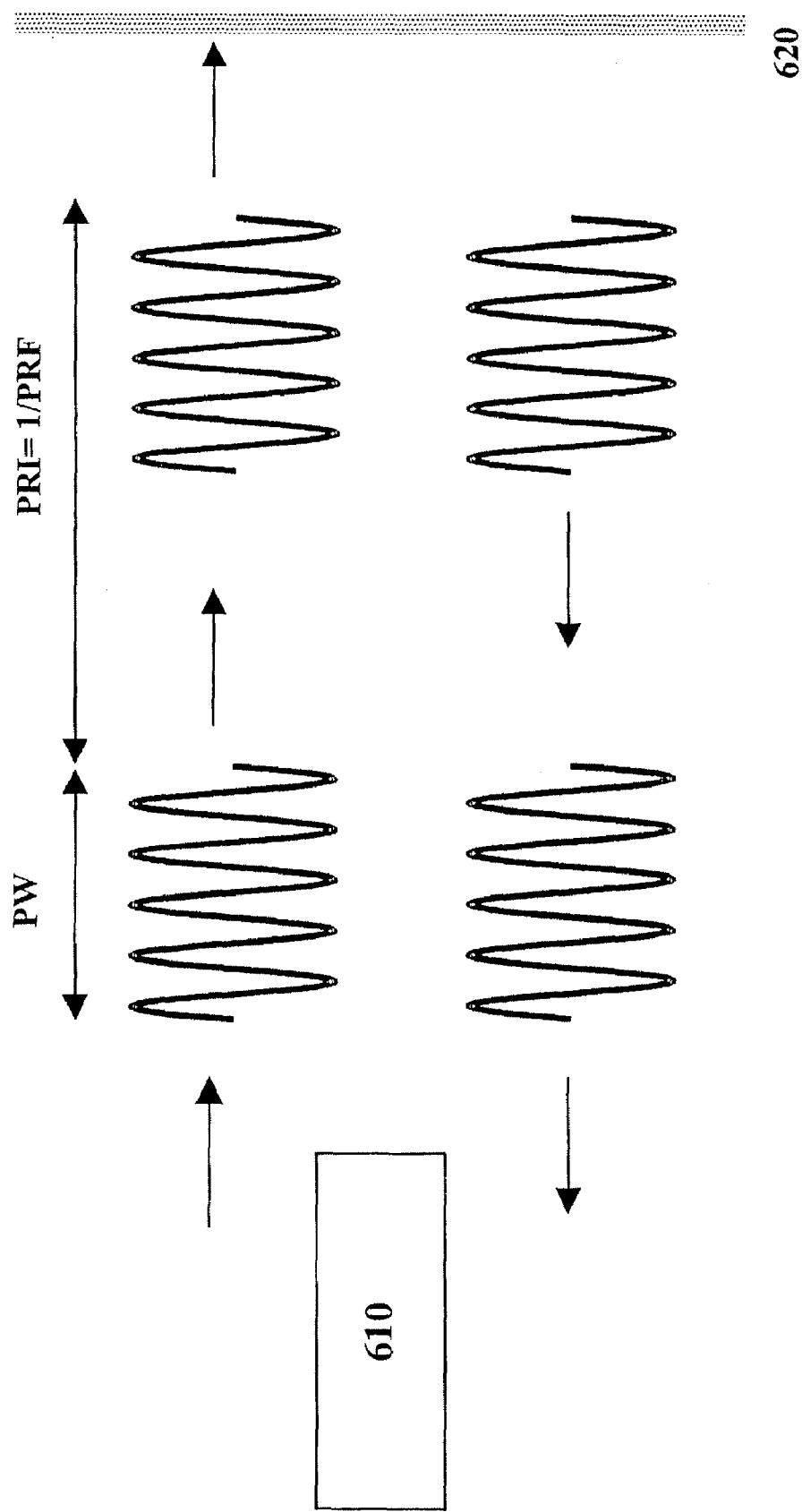
FIG. 6 shows simplified signals for a pulsed ultrasound technique.

Pulse Doppler and later-developed Color and Power Doppler, allow using information from many pulses to extract both range and frequency information. In this way, motion may be indicated on an image display (not shown) with a color map that represents different frequencies or velocities for specific tissue of interest. Such devices are also generalized in FIG. 4, where modulator 430 may, in a simplified representation, also appropriately gate the transmitted and received signals, in accordance with the particular pulse repetition frequency (PRF), and pulse width (PW). FIG. 6 illustrates a series of transmitted and received ultrasound signal pulses generated and received by transceiver 610 (functionally equivalent to elements 410, 415, 420, 435, 440, and 430 in FIG. 4), after being reflected from sample 620.

Figure 5:
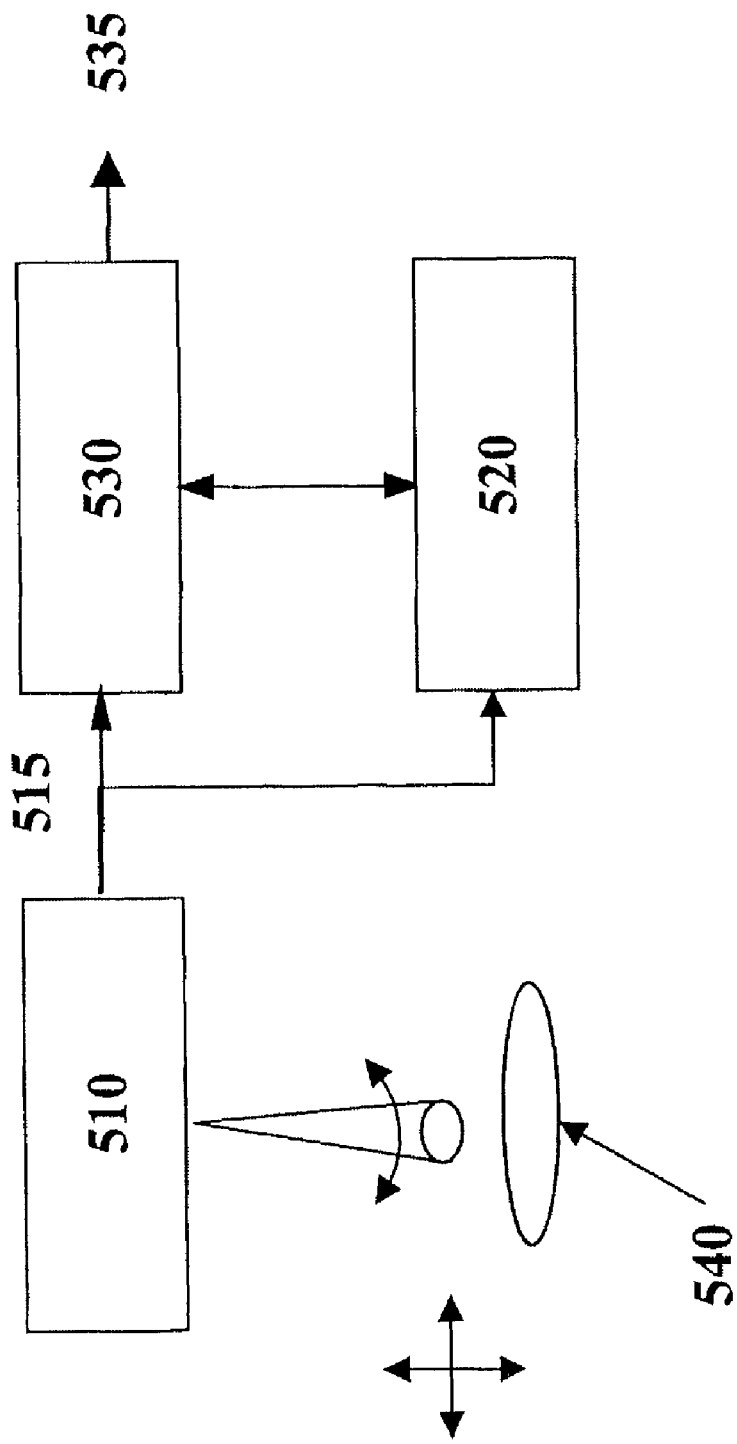
FIG. 5 shows a block diagram of a generalized image analysis system.

FIG. 5 represents a block diagram of an image analysis system 500 which includes, for example, imager 510 (e.g., an ultrasonic imager), which preferably scans sample 540 in at least two dimensions and provides image data 515, most preferably in the form of digital pixel image data, to memory 520 and processor 530. Alternatively, digitization of image data may occur in processor 530, and not in imager 510.

Processor 530 preferably calculates various statistics related to image data 515, including, for example, intensity, entropy, and/or contrast for all or a portion of the pixels representing the image of sample 540. In a further aspect, processor 530 may calculate a vector representation of image data which may include the above statistical values and from which a texture of the surface of the sample may be represented. For example, we have verified that a relatively rough texture is correlated with pixels which have a relatively high contrast value, and a fine texture is correlated with pixels having a relatively high entropy value.

Further, in tumor analysis, for example, processor 530 preferably classifies pixels (e.g., either all image pixels or all image pixels in a region of interest) into a class of tissue, for example, either necrotic or viable tissue. Still further in this regard, processor 530 is preferably programmed to calculate the Mahalanobis distance (MD) (defined infra) between each pixel of all or a portion of the pixels and a centroid of either or both the viable tissue and necrotic tissue. In a further aspect, processor 530 may be programmed to determine the cooccurrence matrix corresponding to the pixel image data which may be used to classify the pixels into one or more classes, e.g., necrotic or viable tissue in the case of tumor analysis.

Reclassification of a pixel from the necrotic tissue class to the viable tissue class could occur when, for example, the MD for the pixel with respect to the centroid of the viable tissue group becomes less than the MD for the pixel with respect to the centroid of the necrotic tissue group. Similarly, reclassification of a pixel from the viable tissue class to the necrotic tissue class could occur when the MD for the pixel with respect to the centroid of the necrotic tissue group becomes less than the MD for the pixel with respect to the centroid of the viable tissue group. Although the centroids of these groups may shift as pixels are added or removed from a group, if a pixel is properly assigned to a group, the MD for the pixel with respect to the centroid of its assigned group will remain less than the MD to the centroid of the non-assigned group.

In terms of actual hardware used in one embodiment, a Parks 1051 CW Doppler ultrasound instrument is used to transmit an 8.1 MHz ultrasound wave into various types of biological tissue including necrotic tissue in a tumor. The frequency-shifted signals were collected, and analyzed digitally. In another embodiment, an ATL HDI®5000 ultrasound system was used for imaging done on subcutaneous tumors. The HDI®5000 uses a mean speed in tissue of 1540 cm/s with an error in non-specific tissue, assumed by ATL to be random, with a range of about 2–5%. In an exemplary embodiment, the PRF selected for the subcutaneous tumors was 1500 Hz, allowing resolution of range to approximately 70 µm. The lower limit of frequency detection for the ATL HDI®5000 was approximately 50 Hz, the low setting for the wall filter.

After reception and demodulation of the received ultrasound signal, the image data, either from a CW or pulsed Doppler process, may be stored in a memory, prior to or concurrent with statistical processing in a microprocessor, for example.

The interior of a tumor is not a homogenous mass of cancerous cells but a mixture of different regions that have different functions in the growth of the tumor and the supporting biology. The regions of interest in an ultrasound image of a subcutaneous tumor may include, for example, ultrasound gel, viable tumor cells, necrosis, muscle, fat and skin. The gel, muscle, skin and fat define the edge of the tumor, and are different enough in acoustic impedance from the tumor interior to provide a fairly distinct border in the image. The primary acoustic tissues within the tumor are viable tumor cells, areas of necrosis, blood vessels and fat vacuoles. The viable tumor cells have nearly identical acoustic characteristics to normal tissue, and therefore appear much the same as the surrounding healthy tissue.

Necrotic tumor cells are a common characteristic of nearly every intact tumor that has grown beyond a minimum size. As the cells divide and the tumor grows, the interior cells grow further away from the capillaries that provide oxygen and nutrients from the blood. Tumor cells have the same or greater nutritional needs as normal cells and those that are too far from the servicing capillary will die in the absence of oxygen. Viable cells that have sustained massive injury or, for lack of oxygen, use up their anaerobic energy stores (adenosine triphosphate—ATP), undergo cellular swelling, plasma membrane disruption and leakage of internal contents, including some nuclear cytoplasm, into the extra-cellular space.

Unlike programmed cell death, or apoptosis, the necrotic cell nucleus does not undergo any morphological change and remains relatively intact, except for some of its fluid content. The nucleus becomes denser, or pyknotic and is no longer constrained in its proximity to other nuclei by the cell. The cytoplasm diffuses through the extra-cellular matrix resulting in some areas of a dense mixture of cytoplasm and pyknotic nuclei and other areas where there are few nuclei. The dense regions appear brighter than viable regions and can be detected at clinical ultrasound frequencies. In some instances, the nuclei are dense enough so that pools of cytoplasm form. If the regions of cytoplasm are not filled with cellular debris, then the corresponding image region will be more like viable tissue and should appear as amorphous hypoechoic areas within the hyperechoic necrotic region.

While the present application is concerned in one aspect with the imaging capabilities of an ultrasonic instrument to discriminate between different types of tumor regions, functional intratumoral blood flow is directly related to the degree of viable tissue. Therefore, the ability to determine, in vivo, the extent of the necrotic core ties in well with contemporary techniques in tumor angiogenesis. Further, since perfusion and viability go hand-in-hand, the role of ultrasound imaging and Doppler ultrasound blood flow measurement complement each other in the clinical research environment.

Figure 7:
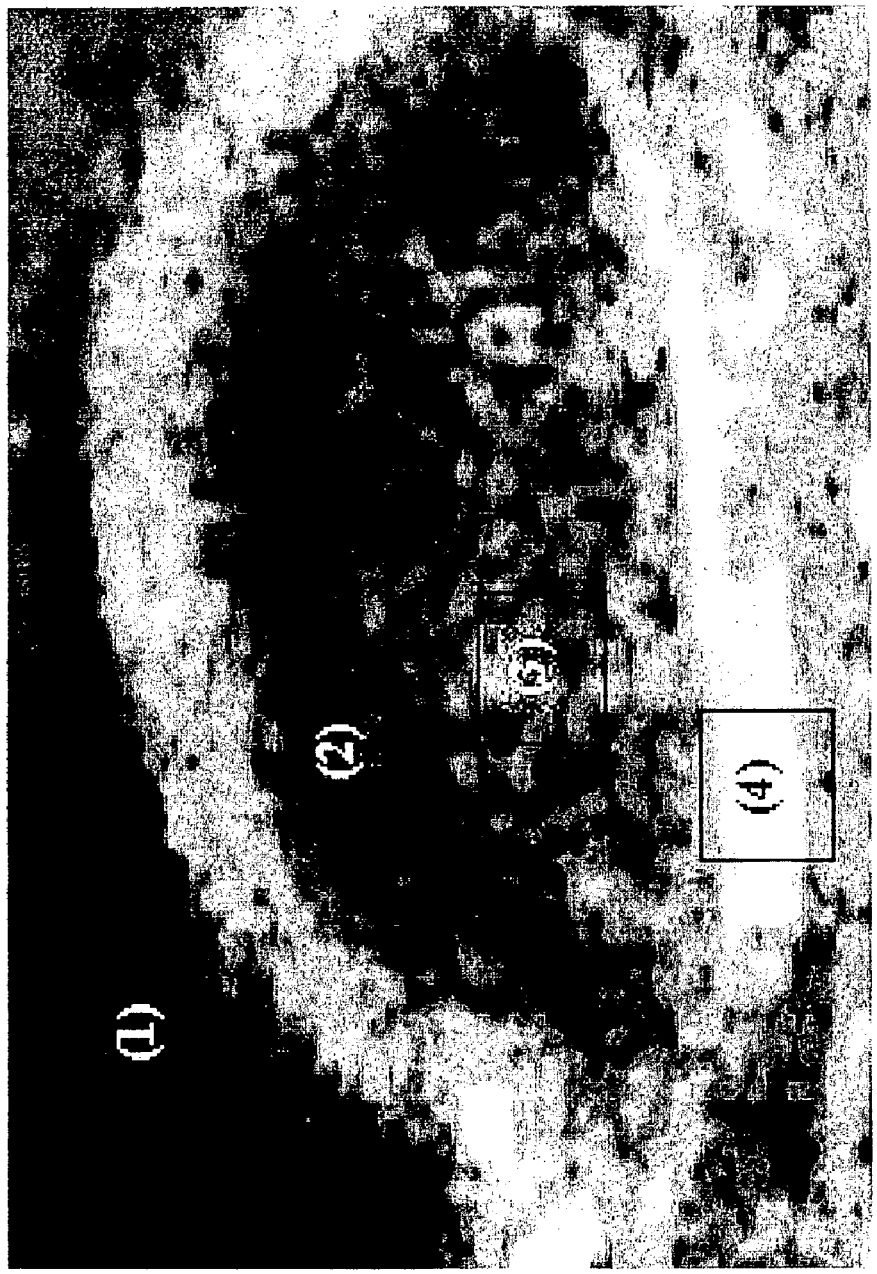
FIG. 7 shows an example of an ultrasound image of a subcutaneous tumor wherein region (1) is the black region which comprises the area outside the body; region (2) is the "near-black" region which comprises a large part of normal-looking tissue in the tumor; region (3) is the medium gray region which is identified by the box; and region (4) is the near white region which identifies the boundary of the tumor and is comprised of skin, muscle and organs.

In an example of an ultrasound image of a subcutaneous tumor shown in FIG. 7, it is apparent that there are distinct regions of intensities that appear to be related. FIG. 7 is an example of a subcutaneous tumor image taken by the ATL HDI® 5000 using a 12 MHz transducer. The tumor type is an Hras (human ras) subcutaneous xenograft on a nude mouse. The edge of the tumor, defined by the surrounding skin and musculature, is very visible as a bright, ellipsoidal outline. The interior of the tumor near the skin, where most of the small arteries are located, is dark, while the deeper region nearer the subdermal musculature is bright. Based on the intensities, the tumor is classified into 4 different regions shown in FIG. 7, wherein region (1) is the black region which comprises the area outside the body of the tumor; region (2) is the "near-black" region which comprises a large part of normal-looking tissue in the tumor; region (3) is the medium gray region which is identified by the box; and region (4) is the near white region which identifies the boundary of the tumor and is comprised of skin, muscle and organs.

For model validation, the a priori knowledge of the distribution of the intensities of each region listed above within a learning set of images can be used to classify the pixels into a particular region. Because there is no guarantee that each image will be statistically identical, the images are preferably stretched and histogram equalized to a uniform 8-bit gray scale map to allow for differences in imaging intensities due to operator, animal, etc. Histogram equalization maps the gray-scale intensity distribution of the images to the desired distribution typically using a maximum likelihood mapping function.

Figure 1B:
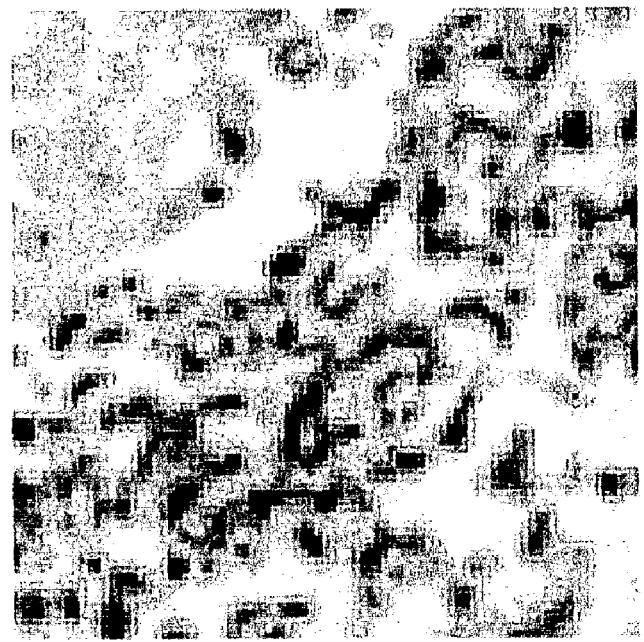
FIG. 1(b) shows a region of necrosis.
Figure 1A:
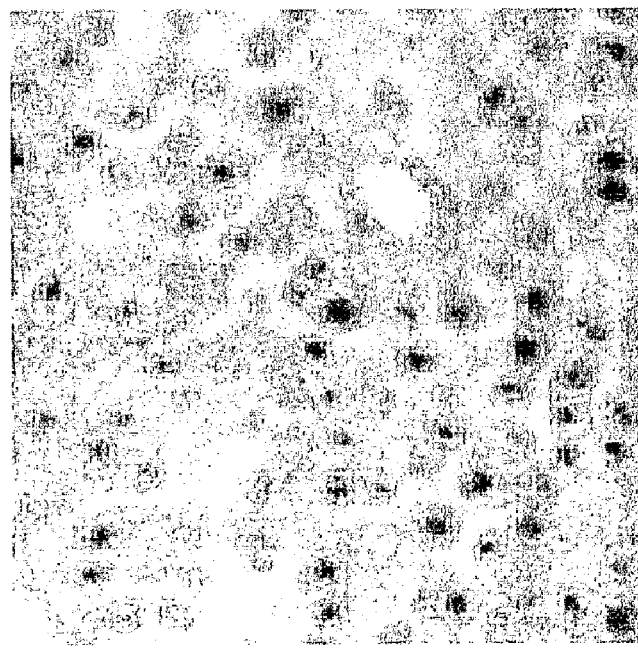
FIG. 1(a) shows a region of healthy tumor cells.
Figure 2:
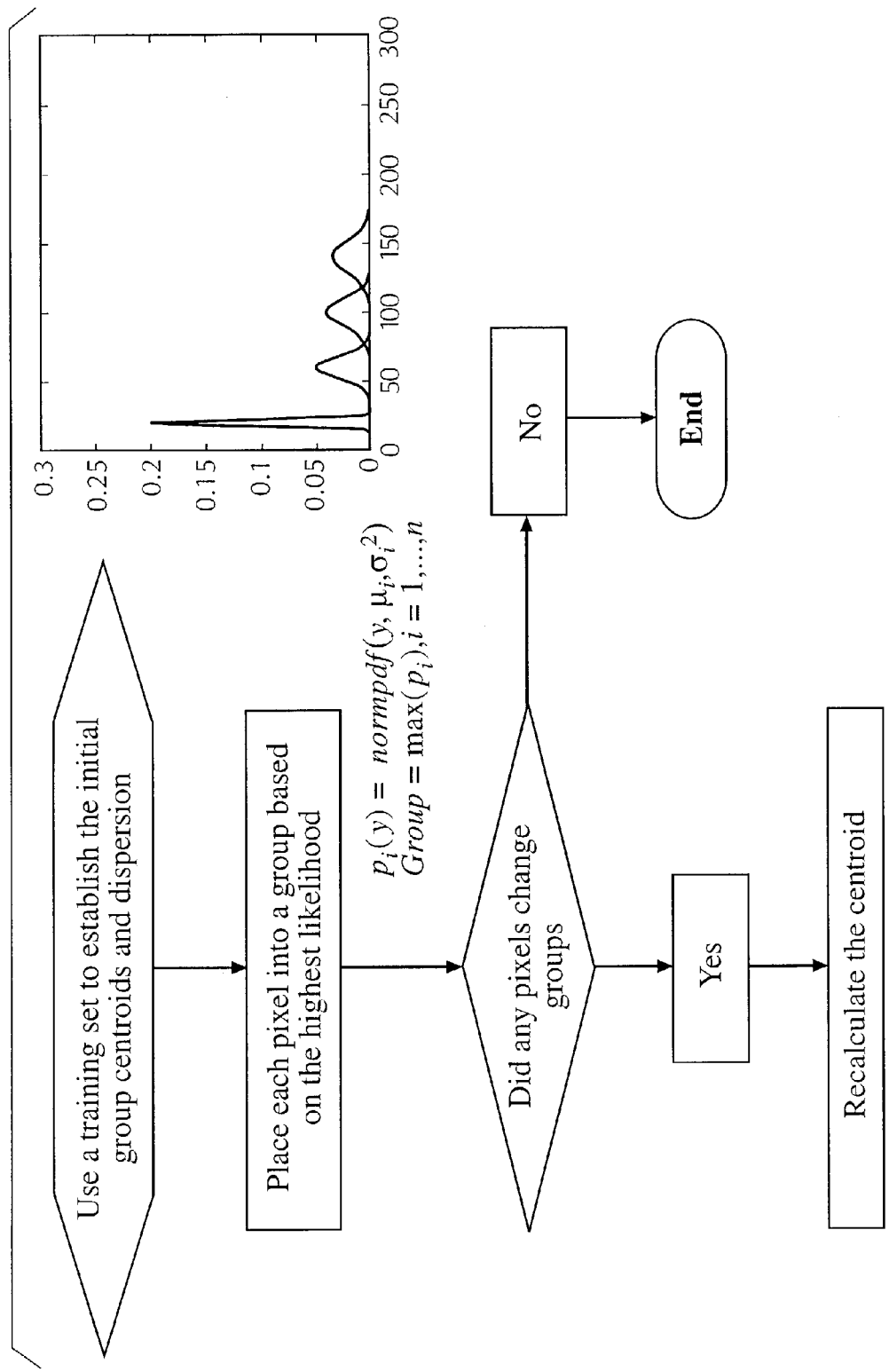
FIG. 2 provides a flowchart of a conventional univariate K-Means segmentation algorithm for normally distributed clusters.

The region centroids and dispersions (standard deviations) provide an initial starting point for clustering. Differences between ultrasound images may distort centroids and dispersion characteristics, but will not change the rank ordering of the groups. Therefore, once initially assigned to a particular class, the pixels can be reassigned depending on their "distance" to each class. In a preferred embodiment, the "distance" is measured as the likelihood function of the multivariate score assigned to the pixel. The algorithm is similar to that shown in FIG. 2, except that the likelihood function is multivariate, and not univariate as depicted. The algorithm includes the steps of:

1. Either define the seeds for the group centroids based on a priori knowledge, or place each pixel into k groups based using a naïve criterion, such as random placement.
2. Update the centroid of each group and reassign the pixels according to predefined criteria based on the maximum probability for belonging to each group. Typically, the likelihood functions are the distances to the group centroids. However, given the probability distribution function and an estimate of dispersion, the group probabilities take the group dispersion into account when assigning a pixel to a group.
3. Recalculate the new group centroids and repeat Step 2 until no more reassignments occur. Recalculation of the group variances should be avoided to keep one group from expanding to the entire data set.

Given normally distributed image clusters, the original pixel groups can be randomly assigned in a naïve clustering, where no prior information is available. In this case, the first reassignment is usually the largest, and subsequent reassignments depend on the distribution of the data. However, the random initial assignment of pixels to groups can cause some problems in the final clustering. If two or more of the original seed points happen to be too close, then the resulting clusters may actually represent the same type of data and the reassignment of pixels would result in a large error. This problem can be reduced if the seeds are determined prior to the original assignment based on a training set of images. The pixel group assignments then update the centroids, and the minimum squared distances, i.e., the Mahalanobis distances, are then used to reassign the pixels and iterate until no reassignments occur.

Traditional k-means clustering usually starts out with a predefined number of clusters. However, if the number of clusters is fixed, outliers can be transferred into a cluster and seriously bias the true cluster centroid, thus distorting subsequent reassignments. Also, if there were no data points that populate a cluster, then the algorithm for updating cluster centroids would require special rules to account for this. Fortunately, neither of these conditions was observed in extensive investigations of mouse tumor tissue. The use of a Gaussian smoothing mask helped reduce the effect of outliers. The size of the image of the tumor was on the order of 50,000 pixels, and the large number of elements in each grouping made the probability of these two problems negligible. Limiting the clusters to four for the original image segmentation to identify the tumor boundary, and to two for segmentation of the tumor into viable and necrotic tissue may preferably minimize the computational load associated with group assignment and reassignment. Methods exist for using similarity measures to optimally determine the number of clusters, but the regions were defined well enough and limited to a small enough area that this was not necessary.

A relatively easy determination of the centroid is the mean of the group. The mean works well if the data is symmetrically distributed, and is ideal for Gaussian distributions when the standard deviation can be reliably estimated. In the case of ultrasound imaging, pixel intensities within a homogenous media are Rayleigh distributed, and the assumption of Gaussian behavior would result in some misclassification. The actual intensity probability distribution function can be determined using the Gibbs sampler, which is a method of accurately determining the probability distribution without requiring the actual functional form of the distribution.

Though the Gibbs sampling algorithms are relatively fast, the computational load can still be expensive for large images. An alternative to the Gibbs sampler for ultrasound images is low frequency filtering of the image to reduce the effects of speckle. This low-pass filtering approach takes advantage of the Central Limit Theorem (CLT) to transform the image into a suitable form which allows for the use of more mathematically tractable Gaussian statistics. The CLT states that, given $$Y = Z_1 + Z_2 + Z_3 + \ldots + Z_n,$$

where $Z1, Z1, \ldots Zn$ are independent and identically distributed, then the distribution of Y is asymptotically Gaussian. This tendency is true for nearly all distributions (Cauchy is one exception), and the convergence is very rapid for symmetric or nearly symmetric data distributions. If a Gaussian mask with a standard deviation that is not too small is used, then the addition of the weighted pixel intensities results in a filtered intensity distribution that is less right skewed, or more normally distributed.

Figure 8:
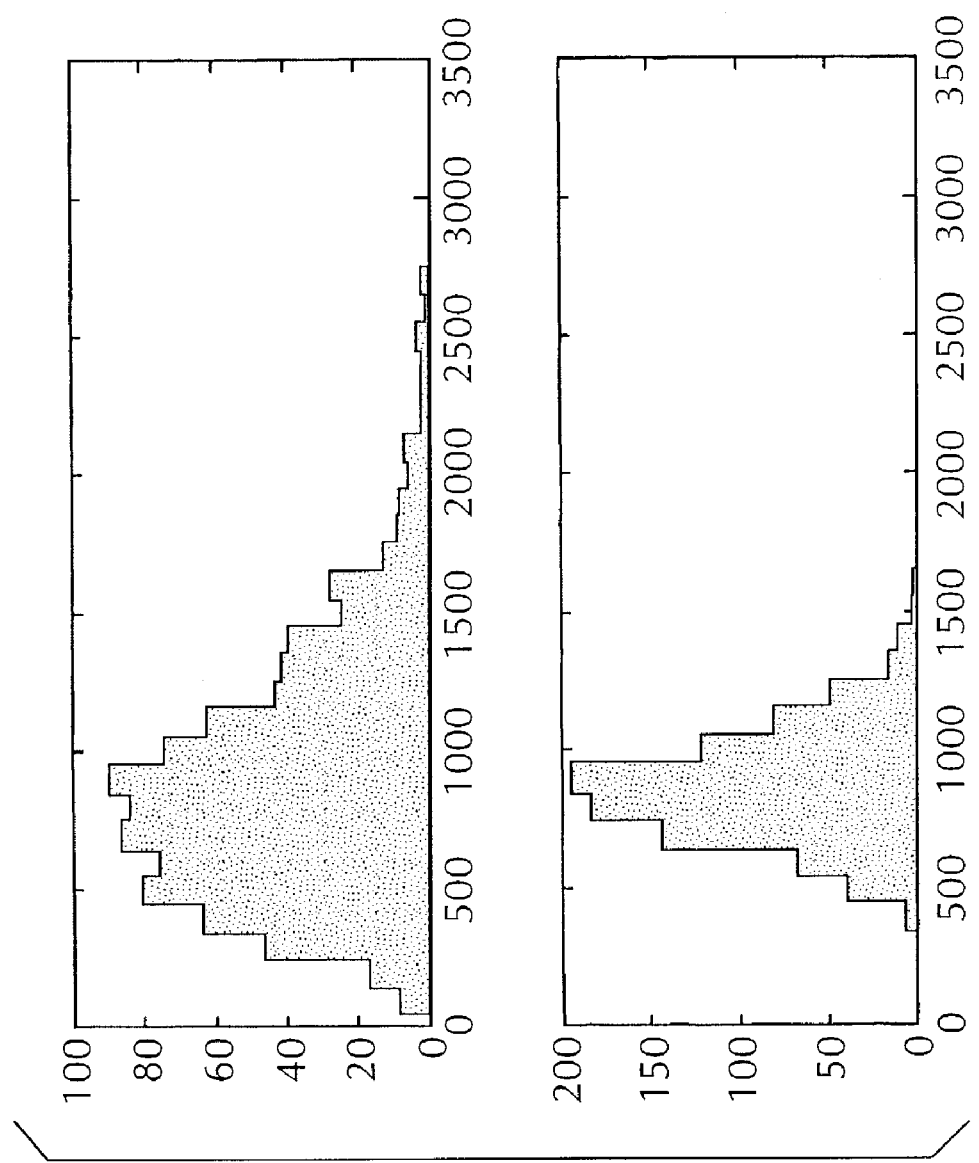
FIG. 8 provides an example of a Gaussian filter's effect on a Rayleigh-distributed random variable.

FIG. 8 shows a simulated response of pixel intensities to a 3×3 Gaussian filter with a standard deviation of 0.7 pixels. The right skewness of the raw pixel distribution is lessened, and the resulting distribution is Gaussian-like. Other filters, such as a median filter, which uses the median of a window of connected pixels, have the same effect on the intensity distributions, since the medians are also Gaussian distributed.

Therefore, to reduce the error of centroid determination based on the mean of the group, and to help reduce the non-speckle type image noise, the pixel data may be filtered with a 3×3 Gaussian filter with standard deviation of 0.7 pixels, for example. The weighted addition of the pixels result in a smoothed data point that is symmetrically distributed but which does not unacceptably blur the edges. With this approach, the resulting smoothed pixels are Gaussian-like distributed, without sacrificing the differentiation of neighboring pixels.

Once an assignment of the pixels to a group is made, the probability, or likelihood, of a pixel belonging to the jth group, given that it was assigned to that group in the previous iteration, is $$\Lambda_j(x_l, k) = p(x_l | M_j(k), x_j(k-1), S_j(k-1))$$

where $x_l$ is the ith pixel intensity in the kth iteration, $M_j$ is the centroid of the jth group and $S_j(k-1)$ is the variance of the jth group. For pre-determined group transition probabilities, the probability of a pixel being in group j at iteration k if it was in group i at iteration (k-1) is then defined as $$\mu_j(x_l, k) = \frac{1}{c} \Lambda_j(x_l, k) \sum_{i=1}^{4} p_{ij} \mu_i(x_l, k-1).$$

The term 1/c is a normalization constant that is the same for all groups, and can therefore be disregarded for comparisons of group probabilities. In a simple, conventional form of k-means clustering, the groups are assumed to be equally dispersed, and the likelihood function is the simple difference between the intensity value of the ith pixel and the centroid of the jth cluster.

$$D_{ij} = |X_i - C_j|.$$

In this case, the normalization constant would be the maximum possible difference between values, or 255 for an 8-bit gray scale. The images analyzed in this research were histogram-equalized to a uniform gray-scale map to stabilize the intensity differences between images. Therefore, each image had intensities that spanned the gray-scale range (0–255). The reassignment of pixels would then be dependent only on the distance, $D_{ij}$, and so the probability transition values will be 1/r for all $p_{ij}$.

One problem with the conventional univariate distance function $D_{ij}$ as above is that each segment is assumed to have equal dispersion characteristics for all intensities. A pixel with an intensity that was numerically closer to one segment with a narrow distribution of intensities may actually belong to the adjoining segment with a wider dispersion. For a Gaussian distribution, the probability of being in one segment is a function of the standardized distance for each cluster, which measures the distance from the cluster centroid by the intensity standard deviation as shown:

$$D_{ij} = \frac{|X_i - C_j|}{\sigma_j},$$

where $\sigma_j$ is the standard deviation of the jth cluster. This type of metric allows for different cluster dispersion characteristics. However, the variance of each of the clusters is preferably not updated at each iteration. Movement into a cluster is likely to happen from values near the edges of the cluster of the previous iteration, increasing that cluster variance, and decreasing the variance of the cluster that was exited. As the variance increases in the first cluster, nearby pixel values will be further reassigned to that cluster, and the variance will continue to increase until all pixels are undesirably assigned to a single cluster.

If prior information from a training set of images is sufficient to characterize each cluster, then the use of the prior information for all iterations is sufficient to establish the probability of cluster membership, with the assumption that the prior variance/covariance estimate is the best estimate.

If, however, segment information is multivariate and the variables are reasonably, but not necessarily, uncorrelated, a situation particularly well-suited to use of the apparatus and method of the invention, then k-means clustering may preferably be generalized using a standardized Euclidean distance that takes advantage of both the variance and covariance of the variables. This standardized distance, also known as the Mahalanobis distance (MD), is the generalized Euclidean form of the standardized distance, $$D^2_{ij} = (X_i - C_j)\Sigma^{-1}(X_i - C_j)',$$

where $X_i$ is the ith pixel measurements, $\Sigma$ is the multivariate variance/covariance matrix and $C_j$ is the centroid of the jth group. The multivariate MD, then, is the multivariate analog of the square of the standardized statistical distance previously discussed.

For two segmentation groups, if the groups are multivariate normal, then the probability of being in the jth group is $$p_j(X_i) = \frac{1}{(2\pi)^{\frac{p}{2}}|\Sigma|^{\frac{1}{2}}} \exp\left(-\frac{1}{2}(X_i - C_j)\sum_j^{-1}(X_i - C_j)'\right),$$

for p variables. The classification criteria can then be chosen by considering the ratios of probabilities. Using the above equation for j=1,2, the ratio of probabilities is $$\frac{p_1(X_i)}{p_2(X_i)} = \exp\left(-\frac{1}{2}\left[(X_i - C_1)\sum_1^{-1}(X_i - C_1)' - (X_i - C_2)\sum_2^{-1}(X_i - C_2)'\right]\right).$$

The criteria of choosing group 1 over group 2 can then be designed into the decision process based on the cost of misclassification. If the cost of misclassification is equal between groups, then the ratio above is compared to 1. Alternatively, if the log of the likelihood ratio is used, then the criteria becomes $$(X_i - C_1)\sum_1^{-1}(X_i - C_1)' - (X_i - C_2)\sum_2^{-1}(X_i - C_2)' = \log(\text{cost criteria}) = 0.$$

If the left side of the above equation is positive, then group 1 is chosen, and if negative, then group 2 is chosen.

If the cost of misclassification has equal weight for both groups, then the probability of misclassification is known to be asymptotically normal. The argument expands to three dimensions for multivariate normality. However, pixel values will nearly always fall between two groups, and the decision for group assignment will be reduced to two primary groups, with the probability of assignment to other groups being much lower than the primary group, and thus able to be ignored.

In the case of variables that are not normally distributed, there are a number of transforms that result in a transformed distribution that closely approximates the normal distribution. These distributions may be determined by the Box-Cox transform, which determines the linear relationship between the log of the binned standard deviation and the log of the binned means. These transforms work for most of the class of exponential functions.

The MD values for the pixels were used in the development of the invention to distinguish between viable and necrotic tissue within the tumor. Equal cost was assigned to misclassification for both groups. Alternatively, if the costs change, then the cost function could be altered, using normal distribution tables, to obtain the desired results.

If a statistical decision is made on the classification of a pixel based on a conventional single variable approach, then the lower and upper bounds are single values. If the decision is based on the individual bounds of two variables, then decision space is a rectangle. However, the joint distribution of two independent variables is an ellipse with major and minor axes parallel to the variable axes. The 2-variable joint decision space, then, is not the same as the individual rectangular space. Furthermore, if the variables are correlated, then the ellipse is slanted. Therefore, if the decision to segment into a group is based on the variables, individually, then the probability of misclassification rises.

Figure 9:
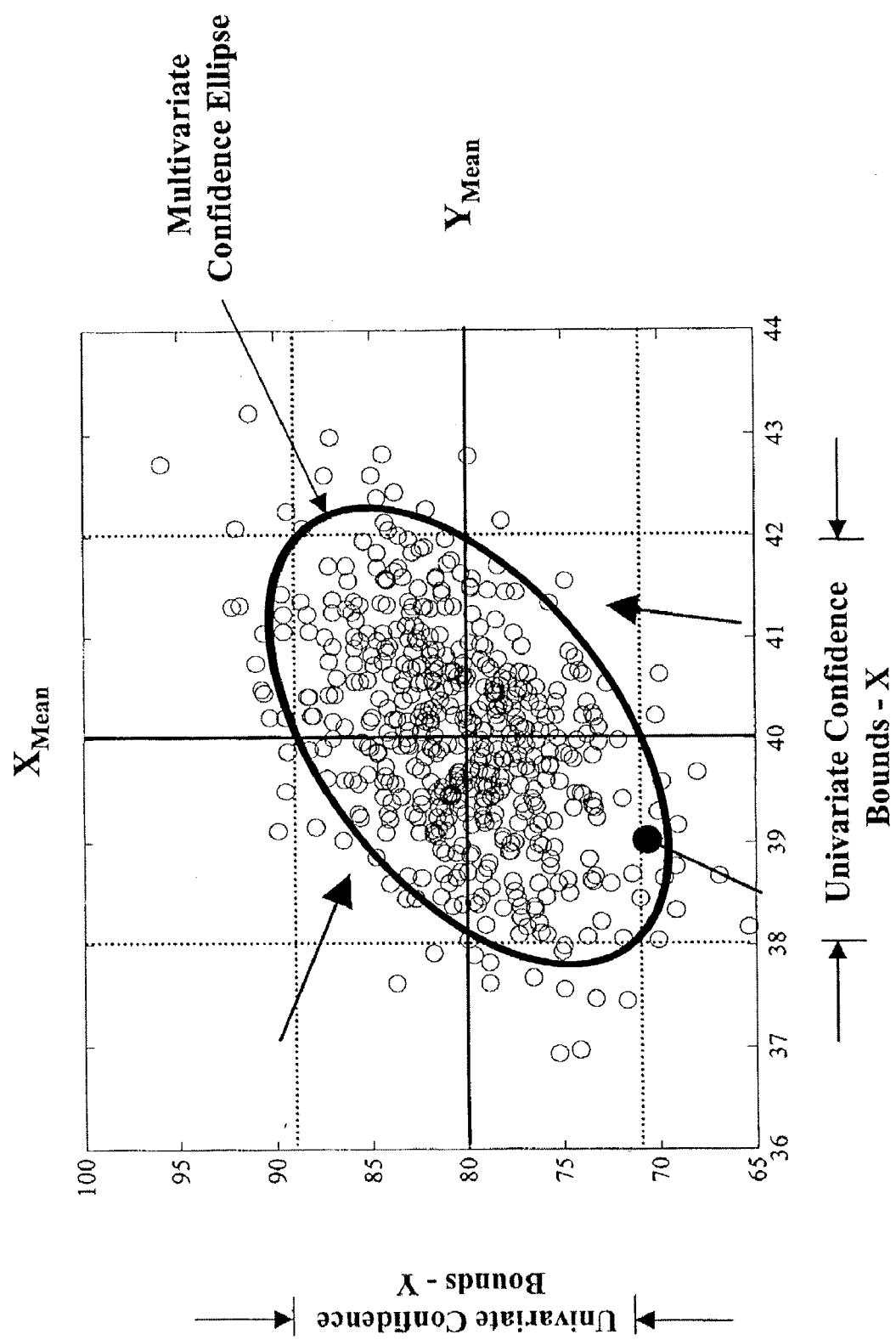
FIG. 9 compares multivariate and univariate 95% confidence bounds for two normally distributed variable having a correlation coefficient of 0.45.

The increased probability of misclassification inherent the univariate decision is demonstrated in FIG. 9 as a simulation between two variables, x and y, with variances of 2 and 8 and a correlation coefficient of 0.45. The univariate confidence bounds are shown on either side of the mean, for each of the variables. The multivariate confidence ellipse is also shown. It is clear that there are regions that are clearly outside the multivariate ellipse, but still within the univariate confidence bounds (e.g., at the arrows). Conversely, there are regions within the ellipse that are outside the univariate bounds (e.g., at the knobbed arrow).

It is clear that univariate analysis of multivariate data increases the probability of both Type I and II errors, and increases the probability of a misclassification of pixels. The probability of misclassification could be reduced with multiple comparison models, but these essentially reduce the size of the univariate confidence bounds to fit into the ellipse to protect against Type I errors, and not Type II errors. Additionally, these methods do not generally take the covariance into account. The MD normalizes the ellipse to the variance/covariance of the data, and transforms the ellipse into a circle to take advantage of any correlation between variables, thus minimizing misclassification that occurs with repeated use of univariate clustering. The reasoning above expands similarly for higher dimensions.

Other methods of clustering are known and have been performed and represented by a statistical comparison means, and method of clustering and comparison may also be achieved by other algorithms, such as Hierarchical Clustering, and Mutually Exclusive analyses. One skilled in statistical analysis of data would be familiar with these and alternate means for use in the instant invention.

Application of the multivariate statistical analysis technique above to a particular type of image will now be discussed. A common feature of most image analysis software packages is the use of histograms to characterize the one-dimensional distribution of pixel intensities. Although this is a useful tool in a region where the intensities are randomly distributed, the histogram ignores the structure of any texture, which has a two-dimensional distribution.

Although there are many different ways of defining texture based on anisotropic patterns, there is no apparent defined texture in the tissue of a tumor. The necrotic areas appear as coarse "blobs" of equal intensities, while viable tissue is finer in structure. Coarse texture can be seen in FIG. 7, region 3, and fine texture in region 2. Measurements of texture are preferably independent of the actual intensities, in order to accommodate differences in intensities that may occur between images as well as within an image.

Independent measurements of texture also increase the information available to the segmentation algorithm. The cooccurrence matrix provides a measurement of the probability that two pixel intensities within a defined neighborhood have the same intensities, regardless of degree of isotropy or actual intensity. This does not assume a particular pattern.

The probability function of the occurrence of two intensities within a connected array of pixels is known as the cooccurrence matrix. The cooccurrence matrix within a window of pixels is defined as the probability that two pixels, separated by a distance vector $D_{ij}$, have the intensities $I_i$ and $I_j$. If the distance vector is limited to separation along the rows and the columns, then the cooccurrence function, h, for a pixel separation of $\delta_{ab}$ and intensities $(I_i, I_j)$, is then defined as $$h_{\delta ab}(I_i, I_j) = p(x_{l,m} = I_i | x_{l+a, m+b} = I_j),$$

for all x within the analysis window. A sample from a small region in FIG. 7, represented in Table I, shows the pixel intensity values. There are 5 levels of gray scale in this example. The cooccurrence function defines a matrix for intensities from 0 to 4 in Table II. A matrix of cooccurrence may be determined using the entire image and all 256 gray scale levels. However, using different window sizes, quantizing the image to a 4-bit gray scale, and limiting the analysis window to a 4×4 pixel window, limits the sparseness of the matrix, thus reducing computational time, while still achieving a reasonable resolution of the image.

TABLE I

Pixel values in a small region shown in FIG. 7

$X =$

| 1 | 1 | 2 | 0 |
|---|---|---|---|
| 1 | 0 | 0 | 0 |
| 1 | 1 | 0 | 0 |
| 2 | 2 | 4 | 4 |

TABLE II

Example of cooccurrence matrix with pixel separation of 1 along the rows of the image window shown in FIG. 7

$H_{\delta 10} = $ i

| | | j | | | | |
|---|---|---|---|---|---|---|
| | | [0] | [1] | [2] | [3] | [4] |
| | [0] | 3 | 2 | 1 | 0 | 0 |
| | [1] | 2 | 2 | 1 | 0 | 0 |
| | [2] | 1 | 0 | 1 | 0 | 1 |
| | [3] | 0 | 0 | 0 | 0 | 0 |
| | [4] | 0 | 0 | 0 | 0 | 1 |

The cooccurrence matrix provides a 2-D probability distribution of pixel intensities and, from this distribution, second-order summary statistics can be calculated that represent the dispersion characteristics. Two measures of the coarseness of the texture of a window of intensities are contrast and entropy. If the individual elements in Table II are designated as h(ij), then the contrast and entropy of window X are defined as follows:

$$\text{Contrast:} \quad C = \sum_{i=1}^{4}\sum_{j=1}^{4}(i-j)^2(h(i,j)).$$

$$\text{Entropy:} \quad E = -\sum_{i=1}^{4}\sum_{j=1}^{4}(h(i,j))\log(h(i,j)).$$

Relatively large values of contrast indicate that similar pixel intensities co-occur at large distances, or that the texture is coarse. Entropy is essentially a measure of the homogeneity of the image intensities. Therefore, if the texture is fine, the probabilities of cooccurrence of intensities are close to the same, and the entropy is relatively large (positive). Coarse textures indicate some structure, and so yield small values of entropy. In the image in FIG. 7, the areas in region 3 represent coarse-texture areas of homogeneous intensities, and therefore should yield relatively small values of entropy, and large values of contrast.

The determination of the cooccurrence matrix may be computationally intensive that requires many calculations for each pixel. If the pixel intensities vary approximately linearly and slowly over the extent of the analysis window, then the image can be low-pass filtered and subsampled, and the unsampled pixel values may be further estimated using bilinear interpolation. This method has been shown to be appropriate for ultrasound image analysis using varying connected window sizes.

Figure 10B:
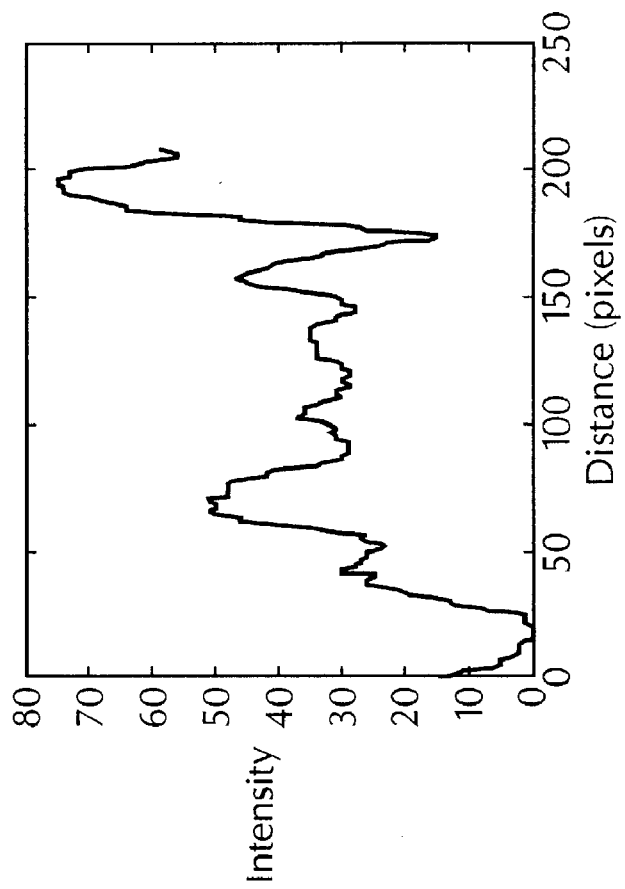
FIG. 10(b) shows pixel intensities along the profile.
Figure 10A:
FIG. 10(a) shows the direction of the profile.

The profile of pixel intensities through a typical tumor is shown in FIG. 10, where the intensities are shown along the white line from top to bottom. While there are some peaks in the profile, the changes are generally slow over a small window, and the assumptions necessary for bilinear interpolation are generally valid for a small window.

Once the intensity, entropy and contrast are determined, the MD is calculated for each of the k segments. The image is then recharacterized into a vector of pixel values. For an image that is m×n pixels, the length of the vector is N. The X matrix is constructed as $$X_j \atop N \times 3 = \begin{bmatrix} I_1 & E_1 & C_1 \\ I_2 & E_2 & C_2 \\ \vdots & \vdots & \vdots \\ I_N & E_N & C_N \end{bmatrix},$$

where I is the intensity, E is the entropy value and C is the contrast value for each of N pixels. The value for Σ may be determined from a training set of images where the necrotic and viable tissue is known through histopathology images.

If the training set is defined for the jth group as $X_{0j}$, then the sampled variance/covariance matrix is defined for the vector X as $$\mathop{\Sigma}_{3\times 3} = \frac{1}{N-1}([X - \mathop{E}_{N\times 3}(X)]'[X - \mathop{E}_{3\times N}(X)]).$$

The result is the unbiased estimate of the variance based on the sampled data from the training set of data. However, N>>100 and so the use of the sampled variance is essentially equal to the estimate of the population variance. The result can be expressed as the matrix of the covariances of each pairing of variables, $$\Sigma = \begin{bmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \end{bmatrix}.$$

The off-diagonal values for σ are all zero if the measurements are uncorrelated. For three variables, the data space is then symmetric about the multivariate mean, and the confidence region for the multivariate normal distribution is spherical. This is a desirable situation, because the information provided by each of the variables is maximized. During one experiment, the values for Σ for the two groupings, viable and necrotic tissue, were determined from a training set using the Hras tumor, since it was well necrotized. The variance/covariance matrix remained constant throughout the clustering process.

An example using a sample set of pixel intensities for necrotic and viable tissue is shown below. The example centroids, C, and variances, Σ, are $$C_{Necrosis} = [75 \quad 14 \quad -350] \quad C_{Viable} = [30 \quad 8 \quad -420]$$

$$\Sigma_{Necrosis} = \begin{bmatrix} 300 & 36 & 35 \\ 36 & 9 & 6 \\ 35 & 6 & 16 \end{bmatrix} \quad \Sigma_{Viable} = \begin{bmatrix} 30 & 8 & 19 \\ 8 & 8 & 10 \\ 19 & 10 & 49 \end{bmatrix}$$

A typical pixel vector of values is [82 17 −320], and the deviations from the centroids are calculated as $$[D - C]_{Necrosis} = [(82 - 75) \quad (12 - 14) \quad (-320 - (-350))]$$
$$= [\quad 7 \quad\quad -2 \quad\quad 30 \quad]$$
$$[D - C]_{Viable} = [(82 - 30) \quad (12 - 8) \quad (-320 - (-420))]$$
$$= [\quad 42 \quad\quad 4 \quad\quad 100 \quad]$$

The Mahalanobis distances are then calculated as $$MD_{Necrosis} = [7 \quad -2 \quad 30] \begin{bmatrix} 300 & 36 & 35 \\ 36 & 9 & 6 \\ 35 & 6 & 16 \end{bmatrix}^{-1} \begin{bmatrix} 7 \\ -2 \\ 30 \end{bmatrix}$$
$$= 83.54$$

$$MD_{Viable} = [42 \quad 4 \quad 100] \begin{bmatrix} 30 & 8 & 19 \\ 8 & 8 & 10 \\ 19 & 10 & 49 \end{bmatrix}^{-1} \begin{bmatrix} 42 \\ 4 \\ 100 \end{bmatrix}$$
$$= 260$$

It is clear from the above, since the higher MD value corresponds to the lower probability, that the pixel should be classified as necrotic tissue.

In one embodiment, these matrix and statistical calculations may be carried out in the processor shown in FIG. 4 or 5, essentially in realtime, or the image data may be retrieved from memory or other suitable storage or recording media, and the multivariate statistical analysis may be conducted on a network, or at another location separate from the actual measurement location, in either real or non-realtime, using a computer programmed to operate using appropriate computer code to carry out the functions indicated.

Figure 11:
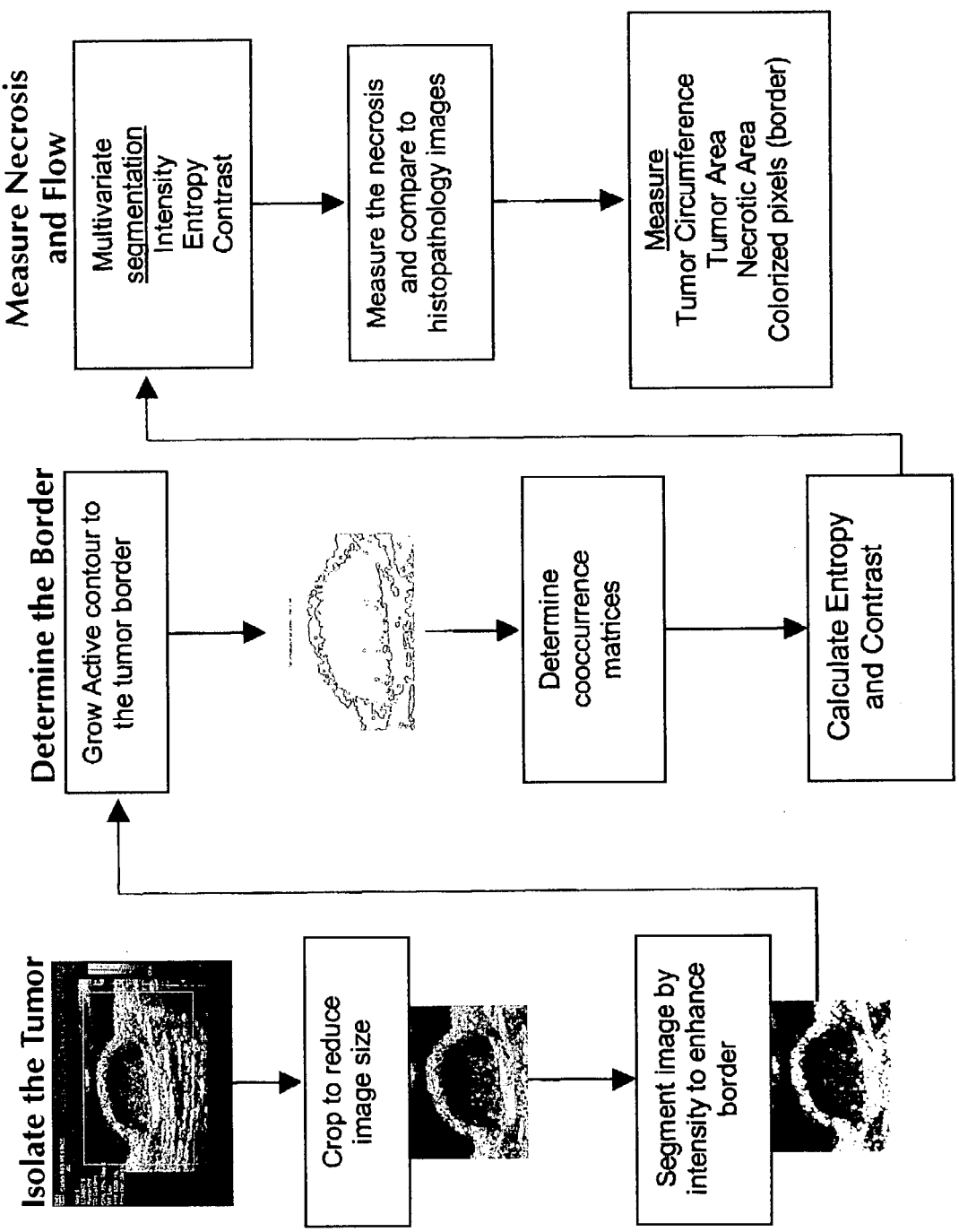
FIG. 11 illustrates a flow diagram of a multivariate image analysis method.

The operation of an embodiment of the system and method of the invention will now be described, with reference to FIG. 11. Images may be collected, for example, using the software installed on the ATL HDI®5000. The images may be collected as a series of 30 consecutive images sampled over 1 second, where these 30 images comprise a cine. The cine capture for each period of interest preferably starts at the end of a breath of the subject animal, and may also include the start of the next breath. The cine loops may be saved by the HDI®5000 to an internal hard drive, in the Data Exchange File Format (DEFF). The images may then be transferred to an intranet server for permanent storage, for example. The NetLink feature of the HDI®5000 can also convert the cine loops to the Digital Imaging and Communications in Medicine (DICOM) format, which is the standard for clinical medical imaging. The DICOM cine loops may also be read and viewed by eFilm™ Medical Inc. medical imaging software. Extracted images can also be converted to real-color uncompressed TIFF format to allow for easier analysis.

Each one-second cine is preferably examined for a single image that does not have any apparent motion that would corrupt the Doppler signal. Additionally, high PD signals would also be seen as bright gray-scale pixels in the conversion from RGB format to 8-bit gray scale. Motion may be detected using the Doppler signal of the ultrasound coupling gel on the skin of the subject. The absence of a Doppler signal in the gel next to the skin is assumed to indicate that the subject is motion-free, so that the image may be extracted.

Additionally, images may be reviewed for systolic events by watching the Doppler signal from a prominent artery. Systole is the peak of the pulse as the blood is pumped throughout the body. Though the detection of flow through the smaller capillaries is generally not possible due to the wall filter of the apparatus, using the systolic blood flow may be desirable to maximize the detection probability in the small peritumoral arteries that feed the tumor.

Next, the tumor preferably is isolated within the image. This may be done by manually tracing the tumor border for every image or, preferably, one may take advantage of the hyperechogenic tumor border to establish the region of interest for further analysis. At the interface between tumor and skin or between tumor and muscle, the reflections are stronger than the backscatter energy from the interior of the tumor itself so that the tumor edge may be detected using known edge detection, interpolation, and edge-connection techniques, for example.

Preferably, analysis of the ultrasound images in gray scale to identify the tumor and to segment the necrotic areas is conducted using the multivariate statistical techniques discussed above. The texture of the necrotic tissue is preferably measured from the cooccurrence matrices using the calculated entropy and contrast values. The intensity, entropy and contrast measurements may be used in a multivariate segmentation of the image to identify the necrosis. To reduce computation time, the image within the detected tumor boundary may be extracted. The number of groupings or clusters may also be reduced to two—viable tissue and necrosis. The multivariate standardized distance, or Mahalanobis distance (MD), is preferably used in the iterative k-means clustering of the pixels of the tumor, in order to segment viable tissue from necrotic tissue.

Once this is done, colorized pixels may be measured and counted on a dilated tumor border expanded to cover pixels within 750 mm of the thinned border, for example. This measurement is preferably used to obtain a surrogate measurement for intratumoral and peritumoral blood flow, respectively. Image analysis may further be accomplished using Matlab version 6.02, for example, and the Matlab Image Processing Toolbox, version 3.0, may also be used for all standard image-processing functions.

Further, in another aspect of the invention, during a treatment protocol for cancer administered over time, the real-time imaging of a tumor described above may be compared in a "before" and "after" treatment timeframe, in order to evaluate the efficacy of the treatment, or to modify the treatment in response to the relative amounts of necrotic or viable tissue seen in the tumor over time.

Algorithms used in the determination of the cooccurrence matrices and the multivariate k-means clustering can be found at the end of this disclosure.

Simulation and Experimental Results

To confirm that the above-described approach provided sound, credible results, experiments using the method and system were set up in three stages. The first stage was to simulate the necrotic areas using a non-central Rayleigh distribution for the necrosis, and a central Rayleigh noise field representing the viable tissue. The coarse texture was also simulated. The next stage was to use a well-studied tumor cell line to develop the multivariate methodology for the detection of necrotic regions and the methods for measuring the blood flow to the tumor. The tumor cell line used was the Hras tumor because of its rapid growth, well-established necroses and moderate angiogenic properties. The third stage was designed to validate the methods of necrosis classification and tumor blood flow with a different tumor type. The tumor cell line used for these data was the B16-F10 tumor, a melanoma.

Figure 12B:
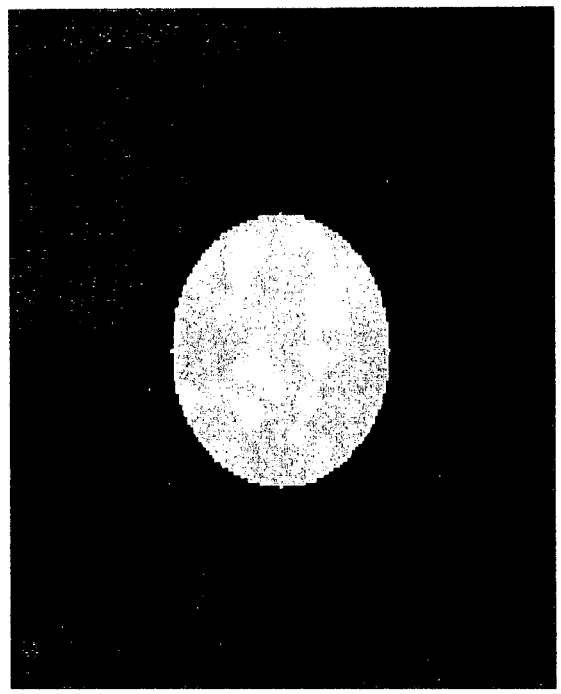
FIG. 12(b) shows a corresponding Poisson Distribution image mask used to simulate a coarse texture of a necrotic region.
Figure 12A:
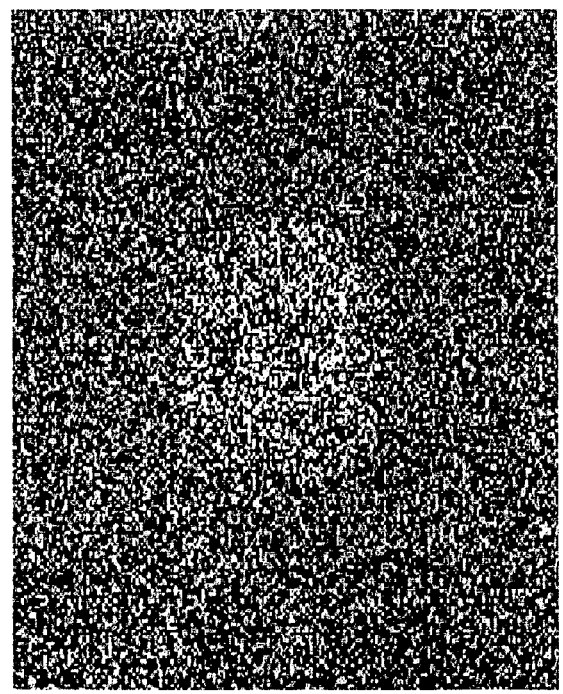
FIG. 12(a) shows a simulated image of a necrotic region within a Rayleigh-distributed noise (viable tissue) field with parameter 1.
Figure 13A:
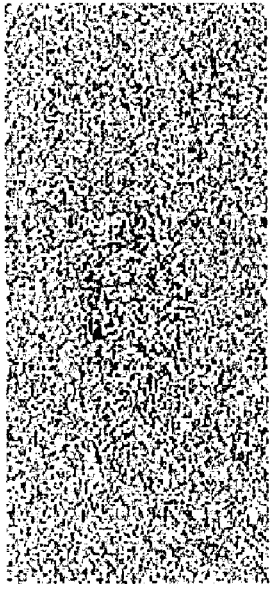
FIG. 13(a) shows contrast, entropy, and intensity images, and FIG. 13(b) compares multivariate (top) and univariate (bottom) image segmentation.
Figure 13A:
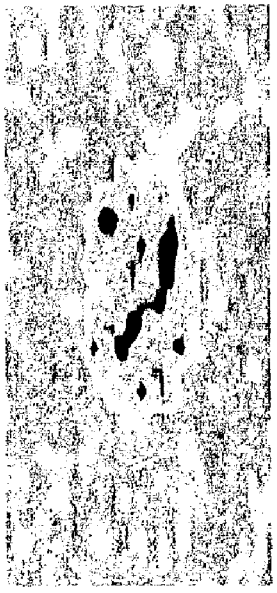
Figure 13A:
Figure 13B:
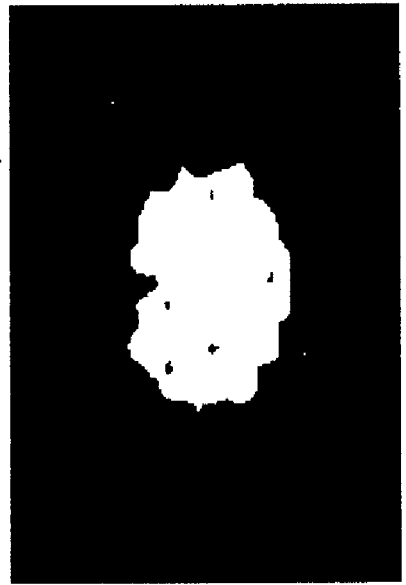
FIG. 13 illustrates image segmentation of a simulated necrotic Area ($\delta=0.5$) within a Rayleigh distributed noise field ($\sigma=1$)
Figure 13B:
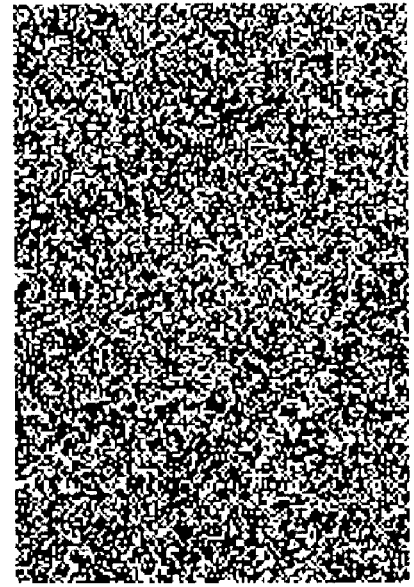
Figures 14A, 14B:
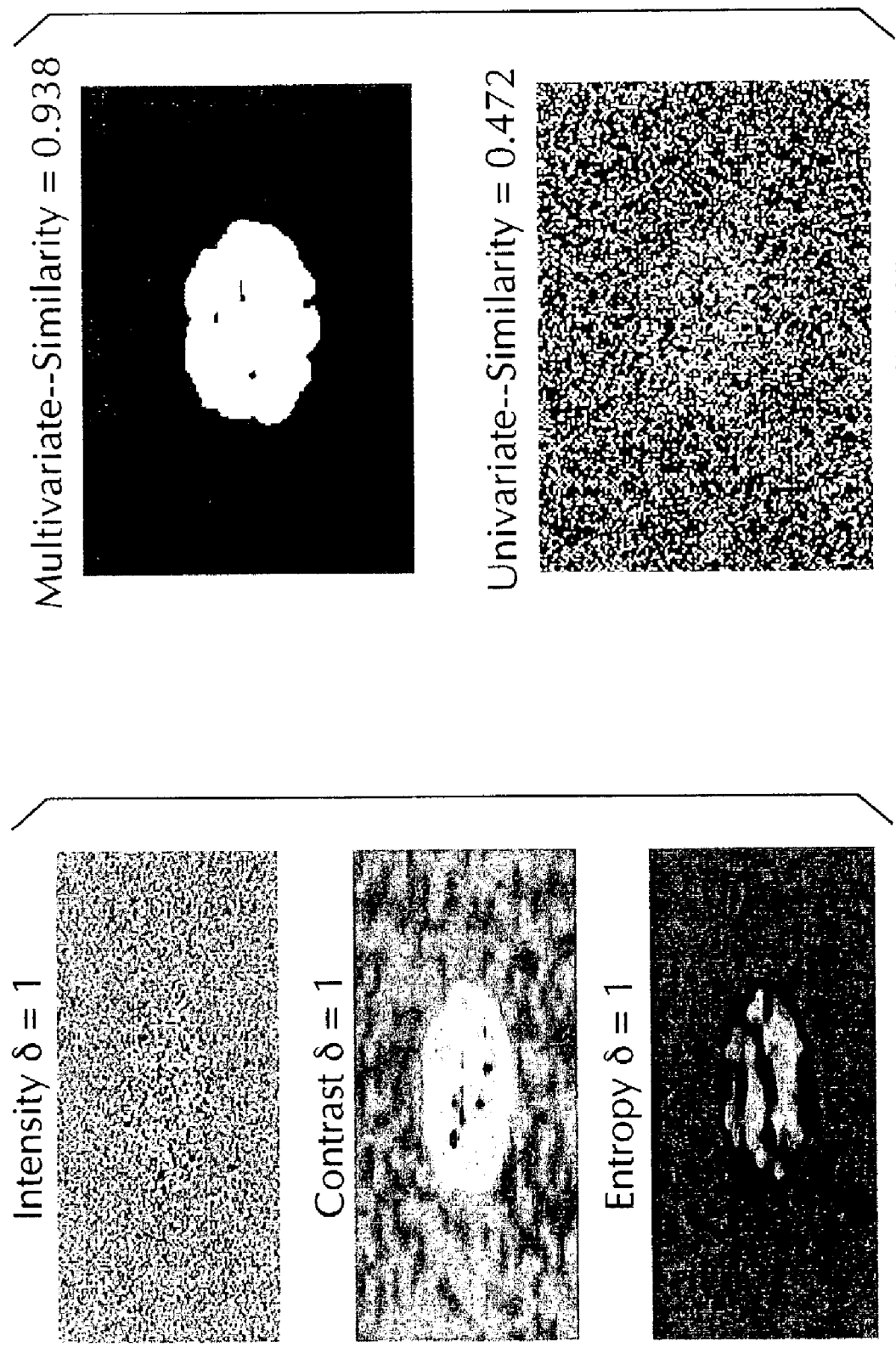
FIG. 14(a) shows contrast, entropy, and intensity images, and FIG. 14(b) compares multivariate (top) and univariate (bottom) image segmentation.
Figure 15B:
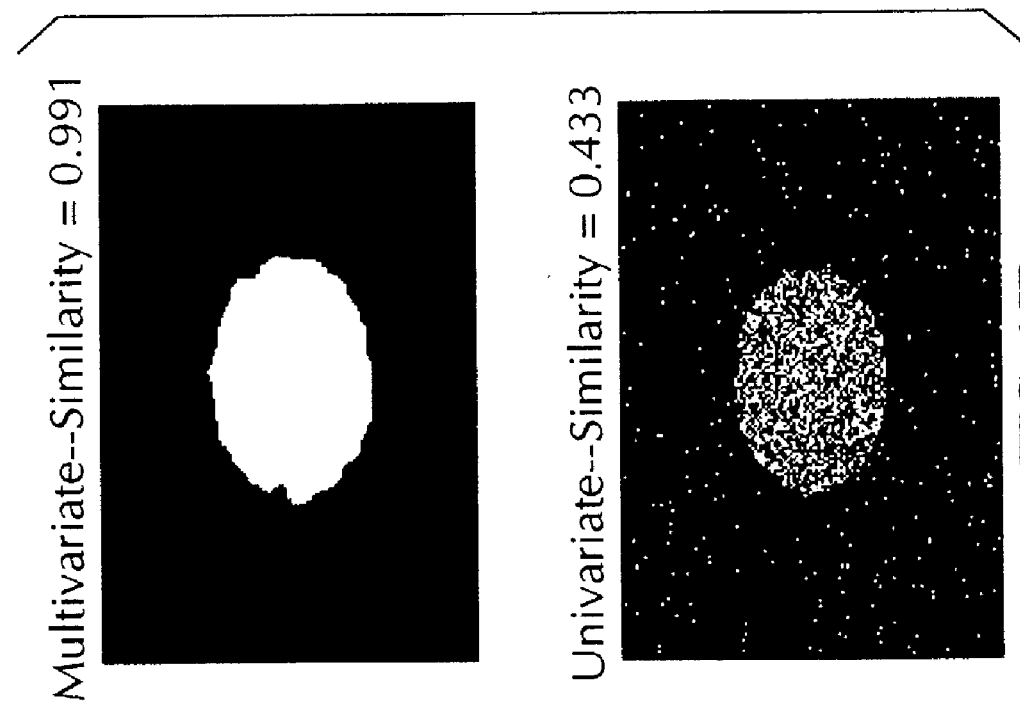
FIG. 15 illustrates image segmentation of a simulated necrotic Area ($\delta=3.0$) within a Rayleigh distributed noise field ($\sigma=1$)
FIG. 15(a) shows contrast, entropy, and intensity images, and FIG. 15(b) compares multivariate (top) and univariate (bottom) image segmentation.
Figure 15A:
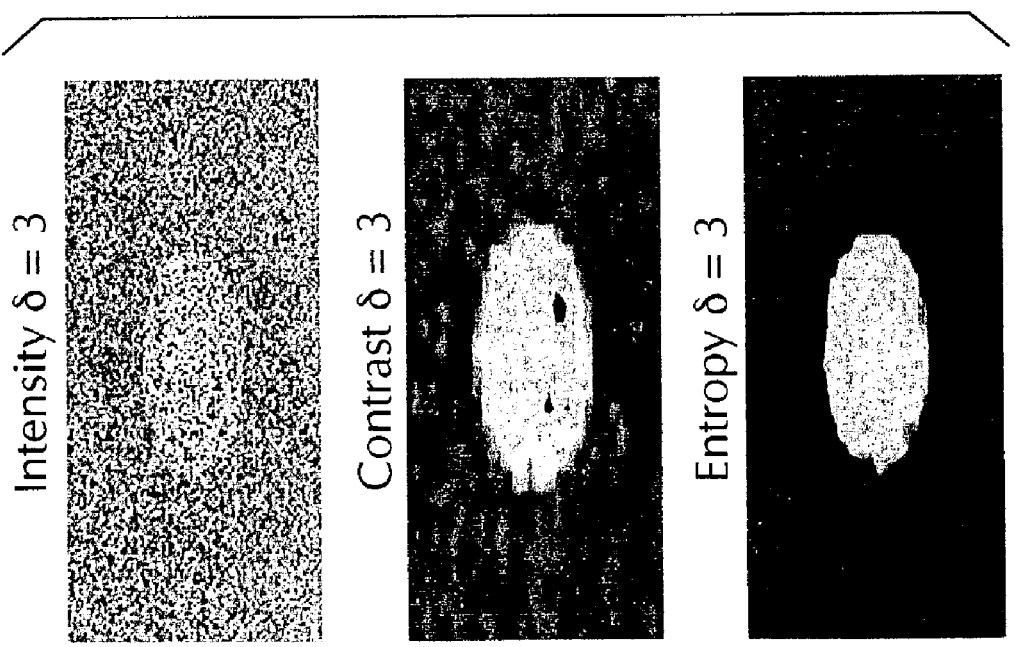
Figure 16B:
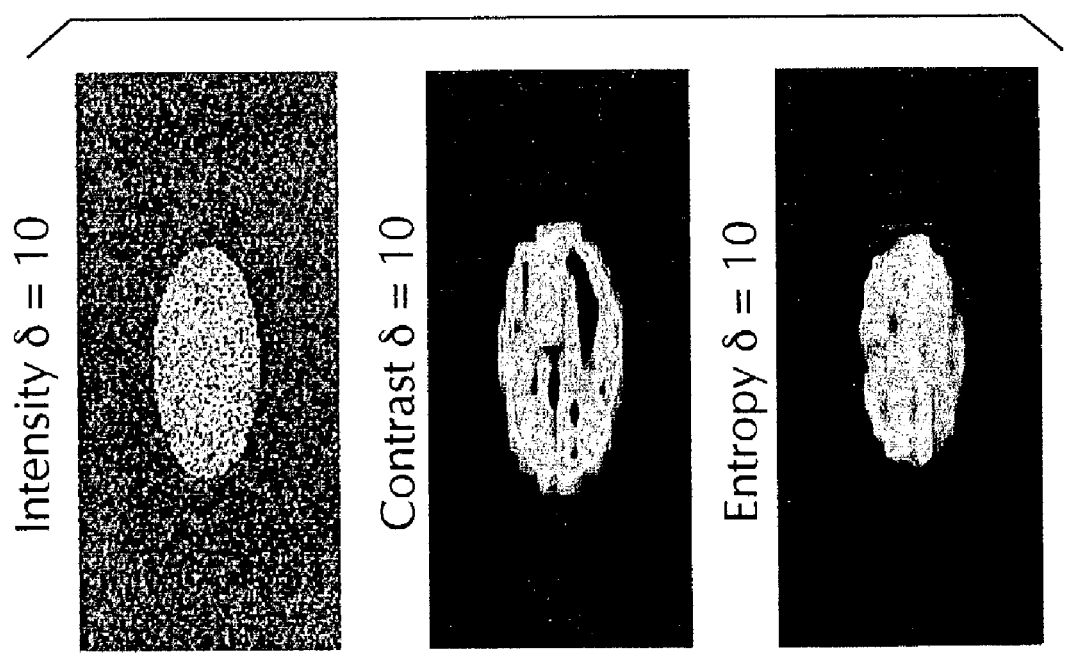
FIG. 16 illustrates image segmentation of a simulated necrotic Area ($\delta=10.0$) within a Rayleigh distributed noise field ($\sigma=1$)
FIG. 16(a) shows contrast, entropy, and intensity images, and FIG. 16(b) compares multivariate (top) and univariate (bottom) image segmentation.
Figure 16A:
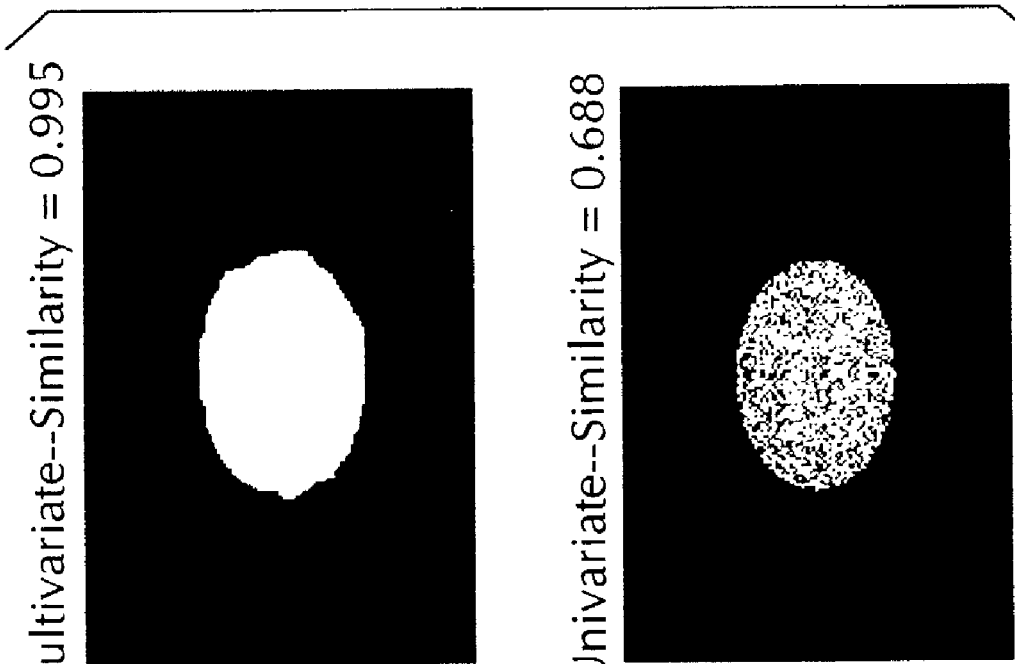

A simulation was run comparing the univariate segmentation of the intensity image to the multivariate segmentation using intensity, contrast and entropy. Matlab version 6.12 was used to create a region of necrosis, characterized by a non-central Rayleigh distribution with varying noncentrality parameters. The necrotic region was further given texture by creating an image mask of Poisson distributed pixel intensities, dilating the texture regions to correspond to the approximate size noticed in tumor images from previous studies, and then using a Gaussian mask to soften the edges of each texton. The texture mask gave a coarse texture to the necrotic region that was not obvious. An example of the simulated image of a necrotic region and the Poisson distribution image mask shown in FIGS. 12(*a*) and (*b*).

The simulation varied the distribution of the pixel intensities within the necrosis with values of 0.5, 1, 3 and 10. The noise field was Rayleigh-distributed with the parameter set to 1. The results are shown in FIGS. 13–16. The similarity measurements and root mean square pixel intensities are shown in Table III.

TABLE III

Simulated Necrosis Image Segmentation Using Multivariate and Univariate Segmentation.

| Necrosis noncentrality parameter | RMS Pixel Intensity of Tumor | RMS Pixel Intensity of Surrounding Tissue | Multivariate similarity | Univariate similarity |
| --- | --- | --- | --- | --- |
| 0.5 | 2.42 | 1.44 | 0.96 | 0.42 |
| 1 | 2.79 | 1.41 | 0.93 | 0.47 |
| 3 | 4.20 | 1.43 | 0.99 | 0.43 |
| 10 | 9.09 | 1.41 | 0.995 | 0.69 |

The texture of the necrosis gave the multivariate segmentation algorithm a distinct advantage in identifying the necrotic areas. Even when the necrotic region had a very low signal-to-noise ratio when compared to the surrounding viable region, the contrast and entropy measurements clearly detected the region. The addition of the texture variables provided the multivariate method with good results, while the univariate use of intensity had poor segmentation results, until the noncentrality parameter increased to 10.

Experiments were conducted on actual tumors in test animals, and the multivariate approach of the invention was correlated with training data obtained from histopathologic analysis.

The principal means of tissue segmentation was a k-means cluster method using a standardized distance and 4 clusters. The initial cluster assignment used prior information from a training set of images to determine the distribution characteristics of the desired tissue types. Assigning pixels to a cluster based on a prior model provides insurance against the problems of randomly assigning two clusters very close to each other. Using a standardized distance enables the clustering to account for very tight or very wide distributions. Initial segment summary statistics, i.e., mean and variance, were determined using an image from the first Hras experiment, and the histopathology analysis of tissue type. While the segment assignments could be done with one iteration using the prior segment summary statistics, there was no guarantee that the segments would be exactly as indicated in the learning model. Therefore, the variances for each segment were assumed to remain constant and the cluster centroids (i.e. arithmetic means) were allowed to update to account for variations in image capture.

Prior to the clustering, the image was filtered using a Gaussian 3×3 filter with a standard deviation of 0.5 pixels. The purpose of the filtering was two-fold: (1) to reduce the effects of high-frequency noise and (2) to shift the pixel intensity distribution from Rayleigh to normal, following the Central Limit Theorem (CLT).

Once the gray-scale image was segmented into the four regions as shown in FIG. 7, regions 2 and 3 were combined to be able to isolate the interior of the tumor from the boundary, which is represented as region 4. Later, region 3 within the tumor boundary was used to further identify different tissue types within the tumor (i.e. necrotic or viable).

The interior of the tumor was segmented from the entire tumor by choosing only those pixels that were inside the border by more than 750 μm, or 15 pixels. This prevented the tumor wall from being included in the calculation, and allowed for some error in the detection of the actual border. The border of the tumor includes some fat, muscle, and other connective tissue that looks much like the necrotic areas within the core.

The texture of the necrotic tissue was measured from the cooccurrence matrices using the calculated entropy and contrast values. The intensity, entropy and contrast measurements were used in a multivariate segmentation of the image to identify the necrosis. The image within the detected tumor boundary was extracted to reduce the computation time. The number of clusters was reduced to two: viable tissue and necrosis. The multivariate standardized distance, or Mahalanobis distance, was calculated, and used in the k-means clustering of the pixels of the tumor.

The images for the tumor study were collected and analyzed using the image correlation with available histopathology determination of necrosis as the measure of similarity. The histopathology images were limited due to limited resources. Similarity of the images analyzed for necrosis was measured as the fraction of analyzed necrotic pixels that were truly necrotic, as identified by the histopathology images. Dissimilarity was measured as the percent of pixels that were analyzed as viable but were within the identified necrotic areas. These numbers were obtained using Matlab version 6.02 and the morphological operators in the Image Processing Toolbox version 3.0. The similarity, $P_S$ was calculated as $$P_S = \frac{I_{necrotic}(\text{computed}) * I_{necrotic}(\text{histopath})}{\sum I_{necrotic}(\text{histopath})},$$

and the dissimilarity $P_{DS}$ was calculated as $$P_{DS} = \frac{I_{necrotic}(\text{computed}) * I_{viable}(\text{histopath})}{\sum I_{viable}(\text{histopath})},$$

where the I matrices are binary, with "1" being assigned to necrotic or viable tissue for $I_{necrotic}$ and $I_{viable}$, respectively, and "0" assigned to the alternate tissue type.

Image processing of the images for peritumoral blood flow was accomplished using the Image Processing, Signal Processing and Statistics Toolboxes in Matlab Version 6.12. Functional relationships of peritumoral blood flow were determined using the Nonlinear Regression package in Statistica® and Labstats, an Excel® add-in used for curve analysis.

INDUSTRIAL APPLICABILITY

The apparatus, system, and method of the disclosed invention has wide applicability to a variety of industrial and medical processes, as discussed above, including analysis of images, including ultrasound images, using multivariate statistical techniques related to texture features of the sample. Although the use of the invention in medical research and clinical treatment, including the treatment and evaluation of treatments for cancer are apparent, the invention may also find application in manufacturing processes, including processes where failure analysis or quality control functions are important, for example, semiconductor device manufacturing, or other fields where image analysis to determine surface textures of materials are of interest. Further, although the applicability of the method and apparatus of the invention has been demonstrated for ultrasound image analysis, further applicability may be found in the analysis of images related to electron microscope (SEM, TEM), MRI, or other modalities.

Examples of Algorithms Used

Representative examples of algorithms used during development of the novel method, apparatus and computer-readable mediu are provided below:

Co-occurrence.m function [hContrast,hEntropy,vContrast,vEntropy] =co_occurrence(y)

% determine the co-occurrence matrix for 4-bit gray scale.

```
y=double(y)*254/255;
[m,n,p]=size(y);
if p>1
    y = rgb2gray(y);
end
y = floor(y/16)+1;
yh1 = [y(:,2:n),99*ones(m,1)];
yv1 = [y(2:m,:);99*ones(1,n)];
hEntropy = zeros(length([1:16:n-16]),length([1:16:m-16]));
hContrast = zeros(length([1:16:n-16]),length([1:16:m-16]));
ictr = 0;
neoc = 4;
for i = 1:ncoc:m-ncoc
    ictr = ictr+1;
    jctr = 0;
    for j=1:ncoc:n-ncoc
        jctr = jctr+1;
        tempcncr=zeros(ncoc,ncoc);
        E = 0;
        C = 0;
        ya = y(i:i+ncoc,j:j+ncoc);
        yb = yh1(i:i+ncoc,j:j+ncoc);
        for ilvl=1:ncoc
            for jlvl=1:ncoc
                aa=(ya==ilvl);
                bb=(yb==jlvl);
                hij = sum(sum(aa.*bb));
                tempcncr(ilvl,jlvl) = hij;
```

```
                E = -E+hij*log(hij+.01);
                C = C+(ilvl-jlvl)^2*hij;
            end
        end
        hEntropy(ictr,jctr) = E;
        hContrast(ictr,jctr)=C;
    end
end
vEntropy = zeros(length([1:16:n-16]),length([1:16:m-16]));
vContrast = zeros(length([1:16:n-16]),length([1:16:m-16]));
ictr = 0;
for i = 1:ncoc:m-ncoc
    ictr = ictr+1;
    jctr = 0;
    for j=1:ncoc:n-ncoc
        jctr = jctr+1;
        tempcncr=zeros(ncoc,ncoc);
        E = 0;
        C = 0;
        ya = y(i:i+ncoc,j:j+ncoc);
        yb = yvl(i:i+ncoc,j:j+ncoc);
        for ilvl=1:ncoc
            for jlvl=1:ncoc
                aa=(ya==ilvl);
                bb=(yb==jlvl);
                hij = sum(sum(aa.*bb));
                tempcncr(ilvl,jlvl) = hij;
                E = -E+hij*log(hij+.01);
                C = C+(ilvl-jlvl)^2*hij;
            end
        end
        vEntropy(ictr,jctr) = E;
        vContrast(ictr,jctr)=C;
    end
end
```

MODELK3.M

```
function [c,Yc] = modelk3(Img, C, E,xborder,yborder);
% Determine the k-means clustering given the a priori estimate of the cluster
%centers and dispersion. The input variable is the multivariate input with n variables
% The initial cluster centers for the three variables are
% [Necrosis Viable]
% Centroids                        Variances
% Intensities    -->  [75   30]    Intensities    -->  [300 100]
% Contrast       ----> [14    8]   Contrast       -----> [1e5 1e5]
% Entropy        ------> [-350 -420] Entropy      ------> [3    49]
[imrow, imcol]=size(Img);
% Optimum Values
center = [.6 0.1;
         .5  0
         .5  1];
varcenter = [.01  .002;
             1    1;
             1   .2];
% These are the Suboptimum for no prior information on the dispersion
% center = [.6 0.1;
%           .5  0
%           .5  1];
%
%
% varcenter = [1    1;
%              .8   1;
%              1    1];
%Extract only the area inside the tumor walls
[J,BW] = ROIFILL(Img,xborder,yborder);
    clear J
    BW=double(BW);
ITumorindex = find(BW~=0);
ITumor = double(Img).*BW;
I1     = ITumor(ITumorindex);
I1     = imadjust(double(I1)/256,[ ],[0   1],.8);;
% makes up for the changes in intensity
CTumor = double(C).*BW;
C1     = CTumor(ITumorindex);
C1     = imadjust(C1/max(abs(C1)),stretchlim(C1/max(abs(C1))),[0,1],1);
ETumor = double(E).*BW;
```

-continued

```
E1      = ETumor(ITumorindex);
E1      = imadjust(-E1/max(abs(E1)),stretchlim(-E 1/max(abs(E1))),[0,1],1);
% E1 = double(E(:)); clear E
nrows = length(I1)
    %Do [X-C]inv(V)[X-C]' for Necrosis and for Viable
    % This gives an Nx1 vector of standardized distances
center1mat = repmat(center(:,1)',length(I1),1);
center2mat = repmat(center(:,2)',length(I1),1);
    N = zeros(nrows,1);
    V = zeros(nrows,1);
    % For Entropy Measurements
    MVNcntr = ([I1 , C1 , E1]-center1mat);
    MVVcntr = ([I1 , C1 , E1]-center2mat);
    % Without Entropy Measurements
%       MVNcntr = ([I1 , C1 ]-center1mat);
%       MVVcntr = ([I1 , C1 ]-center2mat);
    % Partition the vector to reduce problems with memory in the determination of the
Mahalanobis Distance
N1 = MVNcntr*pinv(diag(varcenter(:,1)));
V1 = MVVcntr*pinv(diag(varcenter(:,2)));
for i = 1:nrows
    N(i) = sum(N1(i,:).*MVNcntr(i,:));
    V(i) = sum(V1(i,:).*MVVcntr(i,:));
end
D = [N,V];
[Y,I] = min(D,[ ],2);
moved = nrows;
while moved>nrows/100
    Iold = I;
    % Recalculate the centroids of the groups
    center(1,1) = mean(I1(I==1));
    center(1,2) = mean(I1(I==2));
    center(2,1) = mean(C1(I==1));
    center(2,2) = mean(C1(I==2));
    center(3,1) = mean(E1(I==1));
    center(3,2) = mean(E1(I==2));
    %Recalculate the groups
center1mat = repmat(center(:,1)',length(I1),1);
center2mat = repmat(center(:,2)',length(I1),1);
    % For Entropy Measurements
    MVNcntr = ([I1, C1, E1]-center1mat);
    MVVcntr = ([I1, C1, E1]-center2mat);
    % Without Entropy Measurements
%       MVNcntr = ([I1, C1, ]-center1mat);
%       MVVcntr = ([I1, C1, ]-center2mat);
    % Have to break up the vector
N1 = MVNcntr*pinv(diag(varcenter(:,1)));
V1 = MVVcntr*pinv(diag(varcenter(:,2)));
for i = 1:nrows
    N(i) = sum(N1(i,:).*MVNcntr(i,:));
    V(i) = sum(V1(i,:).*MVVcntr(i,:));
end
D = [N,V];
[Y,I] = min(D,[ ],2);
    % Calculate the number of values that moved
    moved = sum(I~=Iold);
    fprintf(2,'moved = %d\n',moved);
end
c = zeros(size(Img));
Yc = zeros(size(Img));
Yc(ITumorindex) = Y;
c(ITumorindex) = I;
% figure(4),pcolor(flipud(reshape(c,imrow,imcol))),shading flat
```

Additionally, the disclosure shows and describes only the preferred embodiments of the invention, but as aforementioned, it is to be understood that the invention is capable of use in various other combinations, modifications, and environments, and is capable of changes or modifications within the scope of the inventive concept as expressed herein, commensurate with the above teachings, and/or the skill or knowledge of the relevant art.

Such variations are not to be regarded as a departure from the spirit and scope of the invention, and all such modifications as would be obvious to one skilled in the art are intended to be included within the scope of the following claims. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method of determining the efficacy of an anti-cancer treatment protocol, the method comprising:

initially segmenting a first image of a tumor represented by a plurality of pixels into necrotic regions and viable tissue regions based upon a vector representation of the plurality of pixels;

directing one or more anti-cancer treatments to the tumor;

subsequently segmenting a second image of the tumor into post-treatment necrotic regions; and comparing a relative size of the necrotic regions to a size of the post-treatment necrotic regions;

wherein the vector representation of the plurality of pixels at least includes a contrast value and an entropy value for each pixel of the plurality of pixels.

2. The method of claim 1, further comprising adjusting a treatment protocol based upon the comparison result.

3. A method of treating cancer, comprising:

ultrasonically imaging a tumor;

segmenting an image of the tumor based upon one or more image parameters correlated to a texture of tissue within the tumor;

determining necrotic segments of the segmented tumor image based upon the correlated texture of the tissue within the tumor;

providing a cancer treatment regimen;

redetermining necrotic segments of the segmented tumor image after said treatment is provided; and comparing relative sizes of pre-and post-treatment necrotic segments of the segmented tumor image;

wherein said one or more image parameters includes at least an image contrast value and an image entropy value.

4. The method of claim 3, further comprising adjusting the cancer treatment regiment based upon results from said comparing step.

* * * * *